(12) United States Patent
Yamaai et al.

(10) Patent No.: US 6,289,120 B1
(45) Date of Patent: *Sep. 11, 2001

(54) METHOD AND SYSTEM FOR PROCESSING IMAGES OF FORMS WHICH HAVE IRREGULAR CONSTRUCTION AND/OR DETERMINING WHETHER CHARACTERS ARE INTERIOR TO A FORM

(75) Inventors: Toshifumi Yamaai, Yokohama; Takashi Saitoh, Sagamihara; Masanori Yamada, Tokyo, all of (JP)

(73) Assignee: Ricoh Company, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,212

(22) Filed: Feb. 2, 1998

(30) Foreign Application Priority Data

Jan. 31, 1997 (JP) .................................... 9-018416

(51) Int. Cl.$^7$ ........................................ G06K 9/34
(52) U.S. Cl. ................................. 382/173; 382/170
(58) Field of Search ........................... 382/61, 175

(56) References Cited

U.S. PATENT DOCUMENTS

| | | | |
|---|---|---|---|
| 4,850,025 | * 7/1989 | Abe | 382/9 |
| 4,933,984 | * 6/1990 | Nakaano et al. | 382/61 |
| 5,101,448 | * 3/1992 | Kawachiya et al. | 382/61 |
| 5,191,612 | * 3/1993 | Katsuyama | 382/9 |
| 5,228,100 | * 7/1993 | Takeda et al. | 382/61 |
| 5,335,290 | 8/1994 | Cullen et al. | |

FOREIGN PATENT DOCUMENTS 7-37036  2/1995 (JP) .

\* cited by examiner

Primary Examiner—Phuoc Tran
Assistant Examiner—Amir Alavi
(74) Attorney, Agent, or Firm—Oblon, Spivak, McClelland, Maier & Neustadt, P.C.

(57) ABSTRACT

A method and system for processing images. An input or scanned image is first processed into a plurality of rectangles. Using these rectangles, a rough classification process is performed to determine if the rectangles define character candidates, horizontal ruled line candidates, vertical line candidates, or form candidates. A processing of the form candidates is performed which allows the determination of whether the form has a regular shape such as a rectangular shape or an irregular shape which includes protrusions from a rectangular shape. The form candidates are analyzed in order to determine if they are irregular forms by constructing and analyzing one or more cores which define the form. After an irregular form is determined, a determination is made as to whether character candidates are inside of or outside of the form. If it is desirable to only perform character recognition on character candidates which are outside of the form, a scanning process is performed in order to determine whether the character candidates are inside of or outside of the form.

4 Claims, 24 Drawing Sheets

| | CLASS | 1<br>WIDTH≤SIZE | 2<br>WIDTH≤SIZE X3 | 3<br>WIDTH>SIZE X3 |
|---|---|---|---|---|
| HEIGHT | 1<br>HEIGHT≤SIZE | CHARACTER CANDIDATE | CHARACTER CANDIDATE | HORIZONTAL RULED LINE CANDIDATE |
| | 2<br>HEIGHT≤SIZE X3 | LARGE CHARACTER CANDIDATE | LARGE CHARACTER CANDIDATE | FORM AREA CANDIDATE |
| | 3<br>HEIGHT>SIZE X3 | VERTICAL RULED LINE CANDIDATE | VERTICAL RULED LINE CANDIDATE | FORM AREA CANDIDATE |

WIDTH

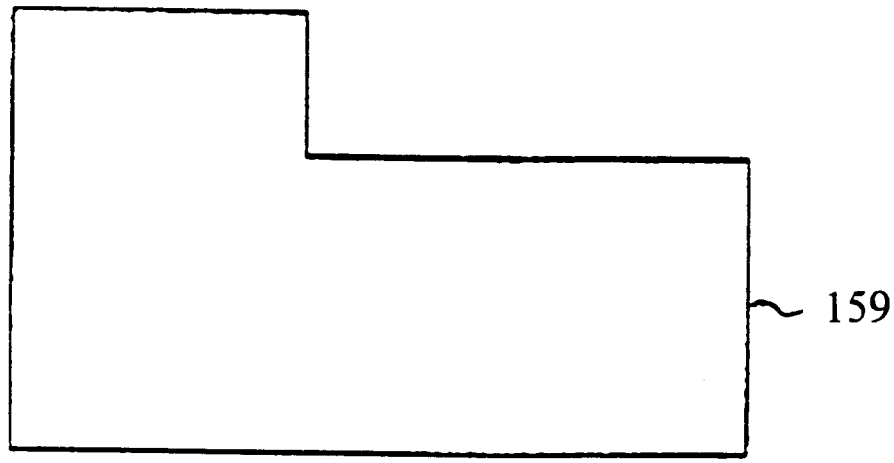
FIG. 9A(1)
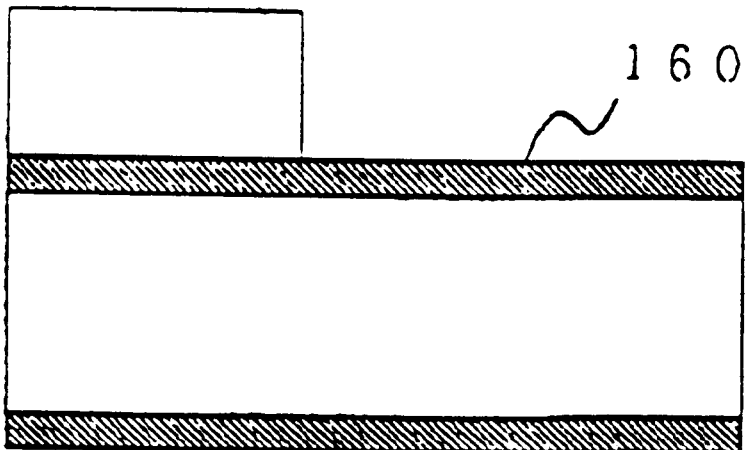
FIG. 9A(2)
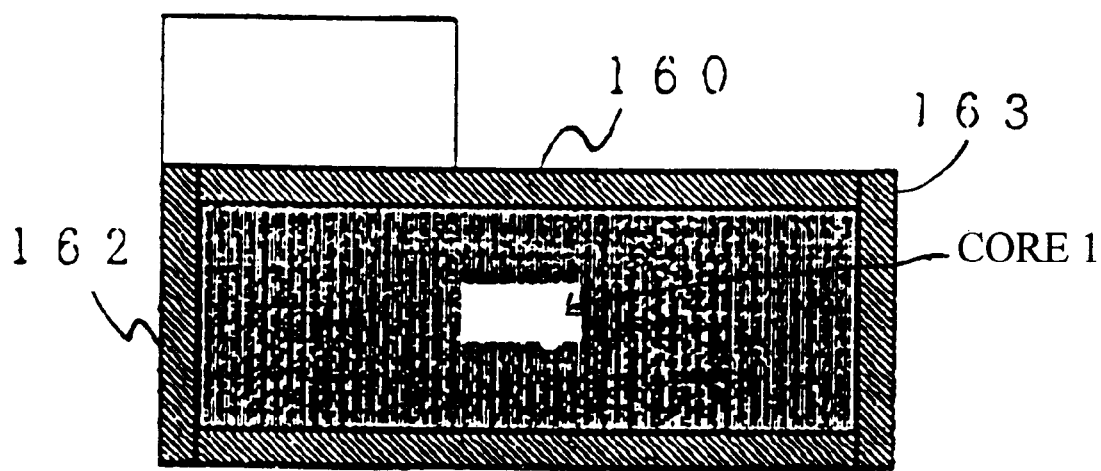
FIG. 9A(3)

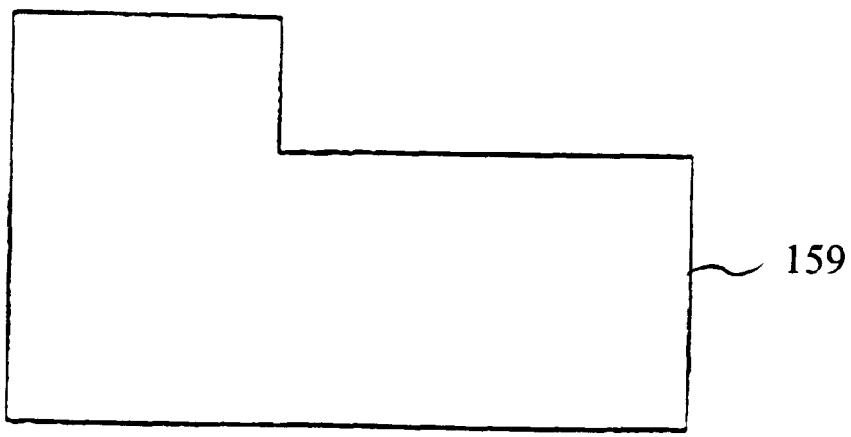
FIG. 9B(1)
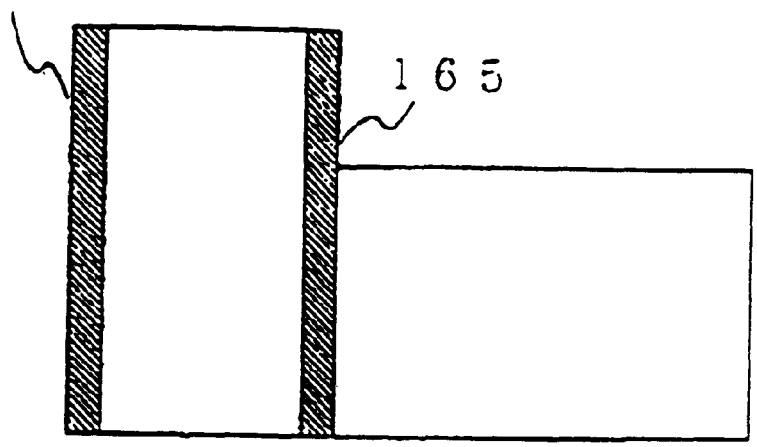
FIG. 9B(2)
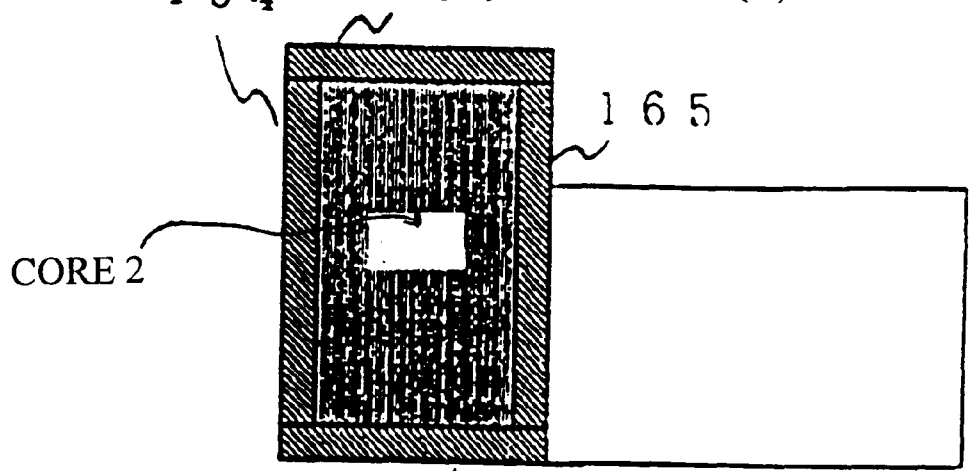
FIG. 9B(3)

METHOD AND SYSTEM FOR PROCESSING IMAGES OF FORMS WHICH HAVE IRREGULAR CONSTRUCTION AND/OR DETERMINING WHETHER CHARACTERS ARE INTERIOR TO A FORM

CROSS REFERENCES TO RELATED APPLICATIONS

This Application claims priority to Japanese Patent Application 9-18416 filed Jan. 31, 1997 which is incorporated herein by reference. This application is also related to U.S. patent application Ser. No. 08/396,585 entitled "Area Separation for Image Having Improved Separation Accuracy" and Japanese Published Patent Application 7-37036 published on Feb. 7, 1995, both of which are incorporated herein by reference.

BACKGROUND OF THE INVENTION

1. Field of the Invention

The present invention relates to a method and system for image segmentation which is applicable to a document image processing system such as an Optical Character Recognition (OCR) system. This invention further relates to a method and system which is able to discriminate both a regular and irregular form area of a document image having a polygonal or complex structure. The invention is still further related to a method and system for determining whether characters are interior to or exterior to a form.

2. Discussion of the Background

As computers and image processing and forming systems become less expensive as technology improves, these systems become more popular and more accessible to the general public. The increasing popularity allows the image processing systems to become even more improved. An example of an improved image processing system is disclosed in U.S. Pat. No. 5,335,290 issued to Cullen et al., which is incorporated herein by reference. The system disclosed in Cullen et al. sets forth a technique of segmenting a document image into areas constituting text and areas which do not contain text. This system demonstrates features used in an image processing system such as compression of a bit-mapped image, and construction of a rectangle in order to process images.

In addition to classifying an image of a document into a text area and a non-text area, Japanese Laid-Open Patent Application 7-37036 published Feb. 7, 1995 discloses an image segmentation function which is used to classify a text area and a picture area of a document image using an image analysis technique. JP 7-37036 discloses the use of a circumscribing rectangle and a provisional ruled line which is extracted from the document image. The present invention has grown out of the system and process disclosed in JP 7-37036 and relies on some of the techniques disclosed in this patent. Specifically, portions of the present invention including at least parts of FIGS. 2, 3A, 3B, 4A, 4B, 5A–5C, 6A–6F, 14 and 15 of the present application are based on techniques set forth in JP 7-37036. However, JP 7-37036 is based on the processing of a regular form image having a rectangular construction and difficulties would arise if JP 7-37036 attempted to process irregularly shaped forms.

SUMMARY OF THE INVENTION

Accordingly, an object of this invention is to provide a new and useful method and system for processing images of forms having irregular construction.

Another object of this invention is to provide a document image processing system which improves the form area processing.

Yet another object of this invention is to provide a system which can determine if a document image has an irregularly shaped form and/or to determine this irregularly shaped form.

A still further object of this invention is to determine whether characters are interior to or exterior to a form, including forms which are irregularly and regularly shaped.

These and other objects are accomplished by a system and method according to the present invention which processes images. First, a rough classification of the images is performed in order to determine horizontal ruled line candidates, vertical ruled line candidates, and form candidates. The present invention classifies the form candidates into specific classes indicating whether the form candidate is a figure or other object, a graph, a surrounding frame, or a form. The form may or may not be a regularly shaped form.

When analyzing whether a form candidate image is an irregular form, a first core is constructed by first determining horizontal lines defining the core and then vertical lines. Also, a second core is constructed by first determining vertical lines defining the sides of the core and then horizontal lines defining the top and bottom of the core. Based on these two cores of the form candidate image being processed, whether or not the image contains an irregular form can be determined. If the image does not contain an irregular form, the image can be classified as a figure or other type of area, or as a graph. The conclusion that the form candidate contains a regular form can be reached either before the irregular form determination process or during the irregular form determination process, or alternatively after the irregular form determination process.

Another feature of the invention is determining whether characters are inside or outside of a form. This aspect of the invention is particularly helpful for irregularly shaped forms. The invention allows the determination of what constitutes an irregular area or form and what constitutes characters outside of the form. With this proper classification performed, an optical character recognition (OCR) process can be performed on images of characters interior to an irregular form. Without the form of a cell outside of the form, it may be difficult to perform an OCR process outside of the form, although the present invention can perform an OCR process on images of characters which are either interior to or exterior to a form. Prior art systems cannot determine cells which are part of an irregularly shaped form and therefore, cannot perform an OCR process for these forms as the cell cannot be determined.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6A and 6B illustrate two examples of forms, FIG. 6C illustrates an example of a surrounding frame, FIG. 6D illustrates an example of a graph candidate, and FIGS. 6E and 6F illustrate two different examples of a figure or other type of image;

FIGS. 9A(1)–9B(3) illustrate the process of constructing two different types of cores for the same form;

DESCRIPTION OF THE PREFERRED EMBODIMENTS

Figure 1A:
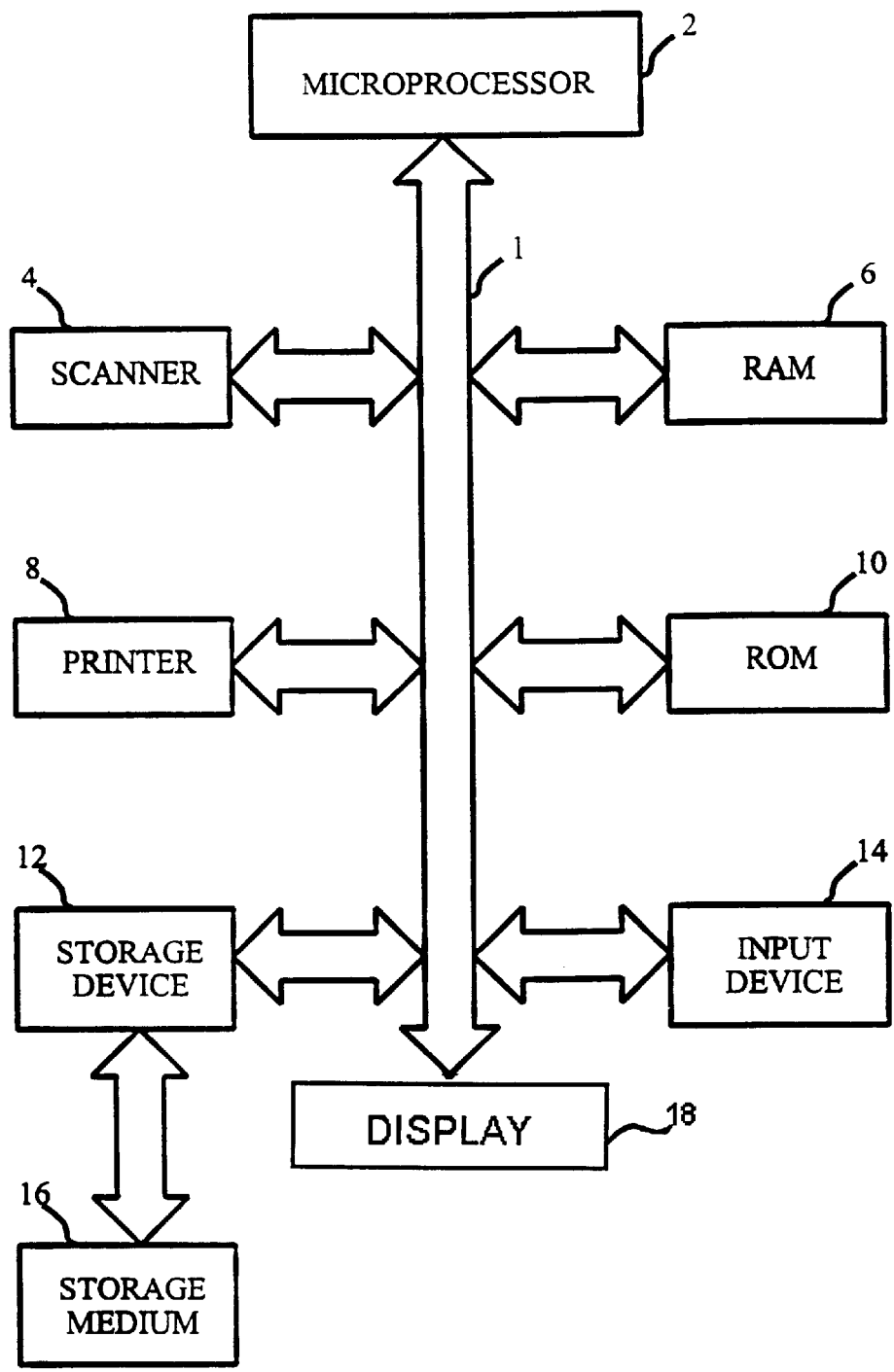
FIG. 1A is an exemplary hardware implementation of the invention.

Referring now to the drawings, wherein like reference numerals designate identical or corresponding parts throughout the several views and more particularly to FIG. 1A thereof, there is illustrated an image processing system according to the invention including a microprocessor 2, a scanner 4, a random access memory (RAM) 6, a printer 8, a read only memory (ROM) 10, a storage device 12, an input device 14, a storage medium 16, and a display 18. Each of the elements illustrated in FIG. 1A are coupled to a bus 1 except for the storage medium 16 which is utilized with the storage device 12. The ROM 10 and/or the storage medium 16 are used to store the computer instructions used to perform the process of the invention. Further, the storage medium 16 is implemented using any suitable medium such as a magnetic disk, an optical disk, or a magneto-optical disk, for example. The scanner 4 is one manner of obtaining images to be processed although the images can be input utilizing the storage device, or through another connection such as through a network or modem. The display 18 is utilized to display various features during the operation of the invention such as the image being processed, the parameters used during the process, the position or status of the process, and any other desired feature. The components of FIG. 1A may be implemented by a personal computer system connected to a scanner 4 and/or printer 8, or utilizing a digital copier or any other desired device, for example.

Figure 1B:
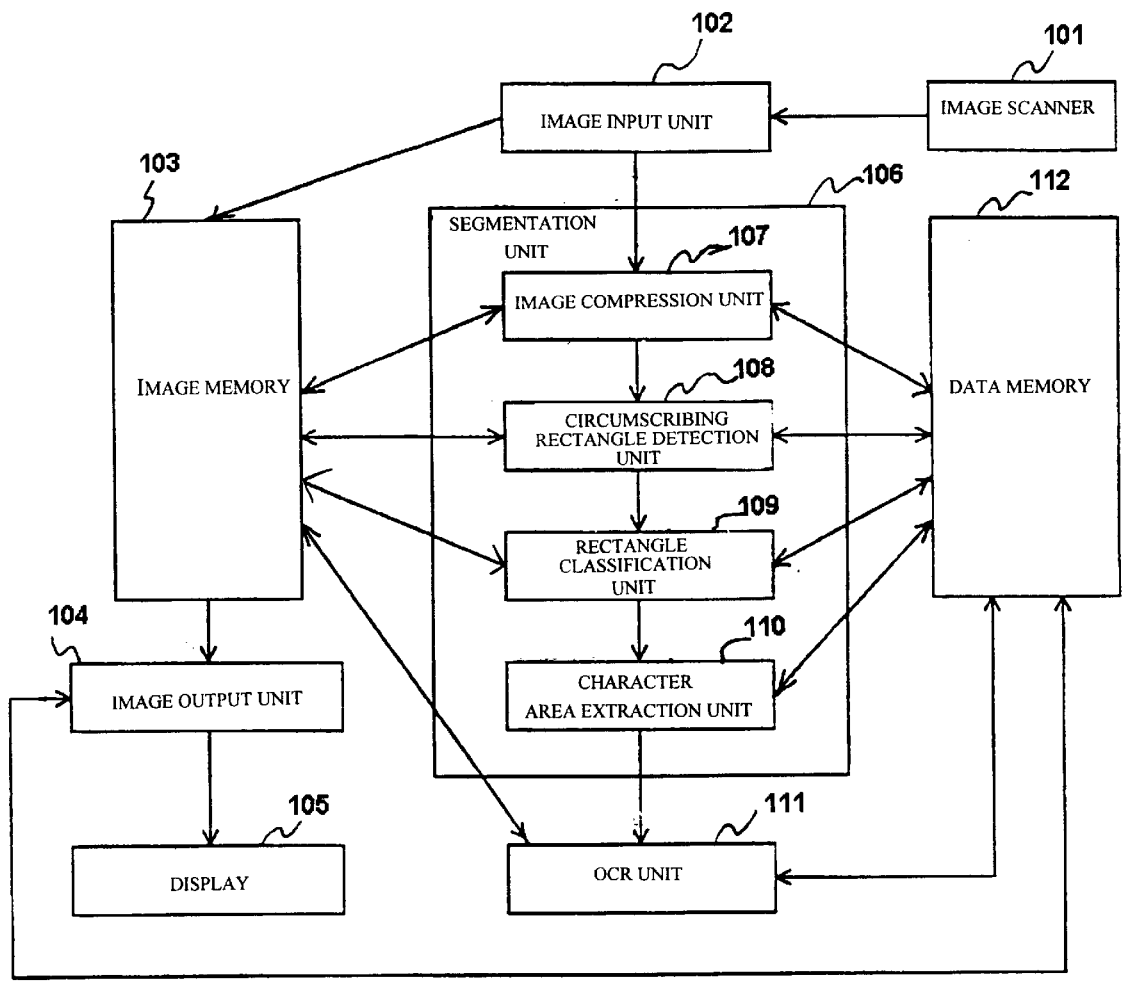
FIG. 1B is a conceptual block diagram of the invention which may be implemented using special purpose circuitry or processors, or is alternatively implemented using one or more general purpose microprocessors or computers.

FIG. 1B illustrates in block diagram format the various aspects of the system. The components illustrated in FIG. 1B may be implemented, if desired, in the system illustrated in FIG. 1A. In FIG. 1A, an image scanner 101 is connected to an image input unit 102 which transmits a scanned image to an image memory and/or a segmentation unit 106. The segmentation unit 106 contains various components or sections including an image compression unit 107, a circumscribing rectangle detection unit 108, a rectangle classification unit 109, and a character area extraction unit 110 which are each connected to a data memory 112. Additionally, the image compression unit 107, the circumscribing rectangle detection unit 108, and the rectangle classification unit 109 are connected to the image memory 103. The data memory 112 is connected to an OCR unit 111 and an image output unit 104 which is connected to the image memory 103. Additionally, there is a display 105 connected to the image output unit 104.

The present invention obtains a document image, for example, in a bit-map representation by an image scanner, for example. The input image data may be compressed so as to reduce the amount of data which needs to be analyzed. For example, if the original image has a resolution of 400 dpi (dots per inch), each 8 horizontal pixels by 8 vertical pixels may be represented by a single pixel, thus resulting in an 8×8 or 64 times compression. Then, circumscribing rectangles are constructed using the compressed image data so that image characteristics may be discriminated. The circumscribing rectangles are composed of connected run-length elements. In this implemented embodiment, a run-length is defined as a set of contiguous black pixels in a compressed scan line.

Figure 2:
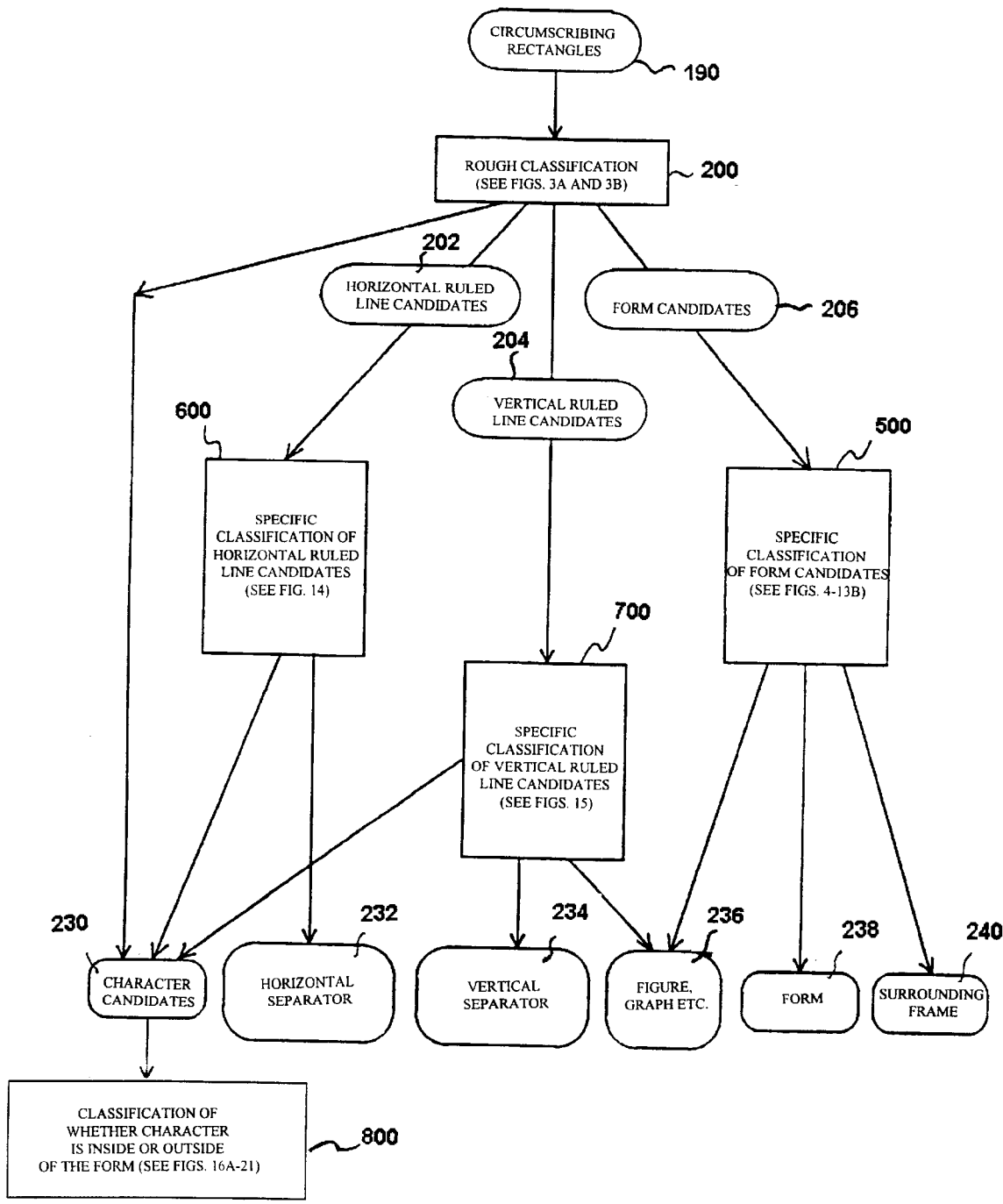
FIG. 2 is a flowchart of the overall process of the invention.
Figures 3A, 3B:
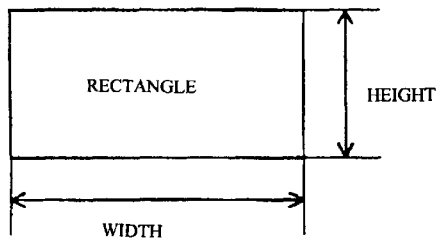
FIG. 3A illustrates the height and width of a rectangle.
FIG. 3B is a table illustrating the rough classification criteria.

FIG. 2 illustrates a general process of the present invention which is utilized to classify one or more images. In step 190, circumscribing rectangles are detected from connected black runs of the compressed image data which is in a bit-mapped representation, for example. Utilizing this information, step 200 performs a rough classification based on the height and width of the rectangles as compared to a standard character size. For example, if the width is less than or equal to the size of the standard character, the width class is 1. If the height of the rectangle is less than or equal to the standard character size, the height class is 1. A rectangle having the width class as 1 and the height class as 1 results in the rectangle being a character candidate. The other candidates which may be determined are illustrated in the table of FIG. 3B. The size of the rectangle including the height and width can be determined by the coordinates of the vertices of the circumscribing rectangle. The process of providing standard character sizes is disclosed in U.S. patent application Ser. No. 08/396,585. Preferably, the standard character size is determined based on a histogram of the height of each rectangle in the document image. However, the threshold utilized by the rough classification may utilize a predetermined value for the character size obtained through experimental results or in any desired manner.

The various classifications appearing in the table of FIG. 3B include a candidate of normal characters (normal character size) a candidate of a relatively large character area, a candidate of a horizontal ruled line, a candidate of a vertical ruled line, and a candidate of a form area. In these classifications, the horizontal ruled line is along a main scanning direction of the document image processing system and the vertical ruled line is along a sub-scanning direction. The candidate of the form may include another area which is not classified among the above-described candidates. Based on the results of the rough classification process, more specific analyses are performed in order to more precisely determine the characteristics of the rectangle. As illustrated in FIG. 2, the results of the rough classification include character candidates 230, horizontal ruled line candidate 202, vertical ruled line candidates 204, and form candidates 206.

When the form candidates 206 are detected by the rough classification process 200 of FIG. 2, a specific classification of the form candidates is performed in step 500 of FIG. 2 which is explained in detail with respect to FIGS. 4–13B. The results of the specific classification of the form candidates in step 500 include the figure, graph, or other classification 236, the form classification 238, and the surrounding frame 240.

Figure 4A:
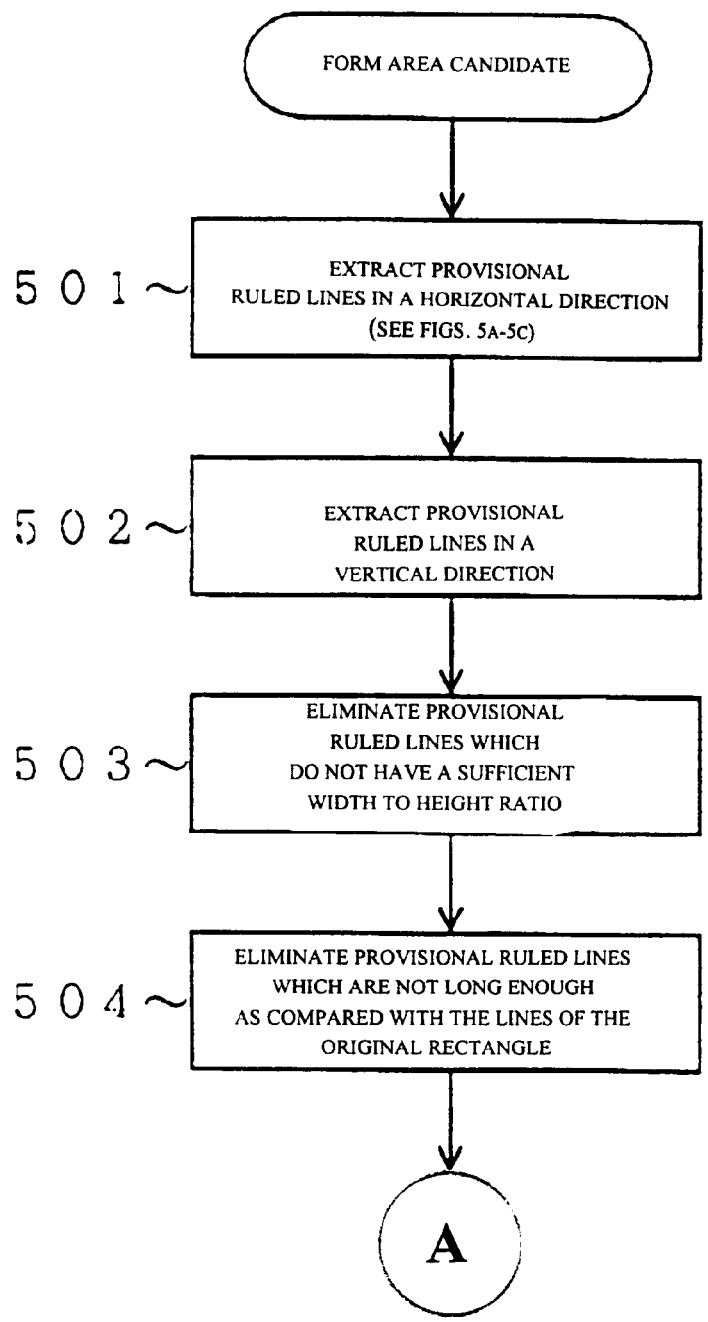
FIGS. 4A and 4B are a flowchart of a process used to classify a form candidate.

FIG. 4A illustrates the specific classification of the form candidates. Hereinafter, a candidate rectangle of the form area is called an original rectangle. Before performing step 501 or during the processing of step 501 of FIG. 4A, the original rectangles are utilized in order to examine the run length. Due to the construction of the circumscribing rectangle representation, rectangles inside of the original rectangle may be lost. According to the inside examination of the rectangles, a provisional ruled line within the original rectangle would be detected if the form area was divided by ruled lines. The provisional ruled lines are detected in the horizontal and vertical direction with their length being based on the beginning and end coordinates thereof.

Figure 5A:
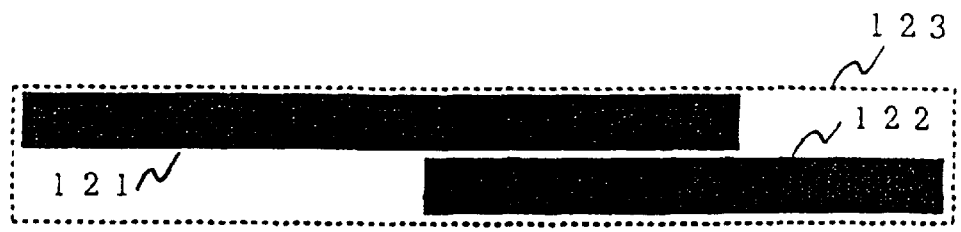
FIGS. 5A–5C illustrate a process of determining a provisional ruled line.
Figure 5B:
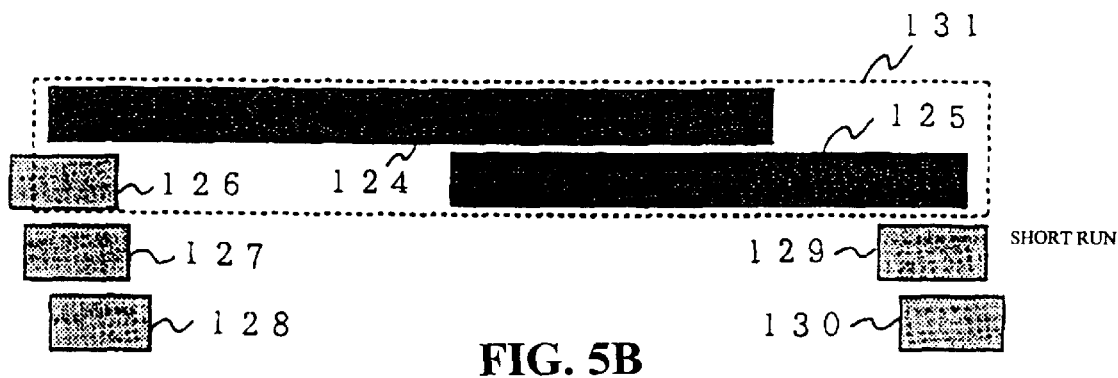
Figure 5C:
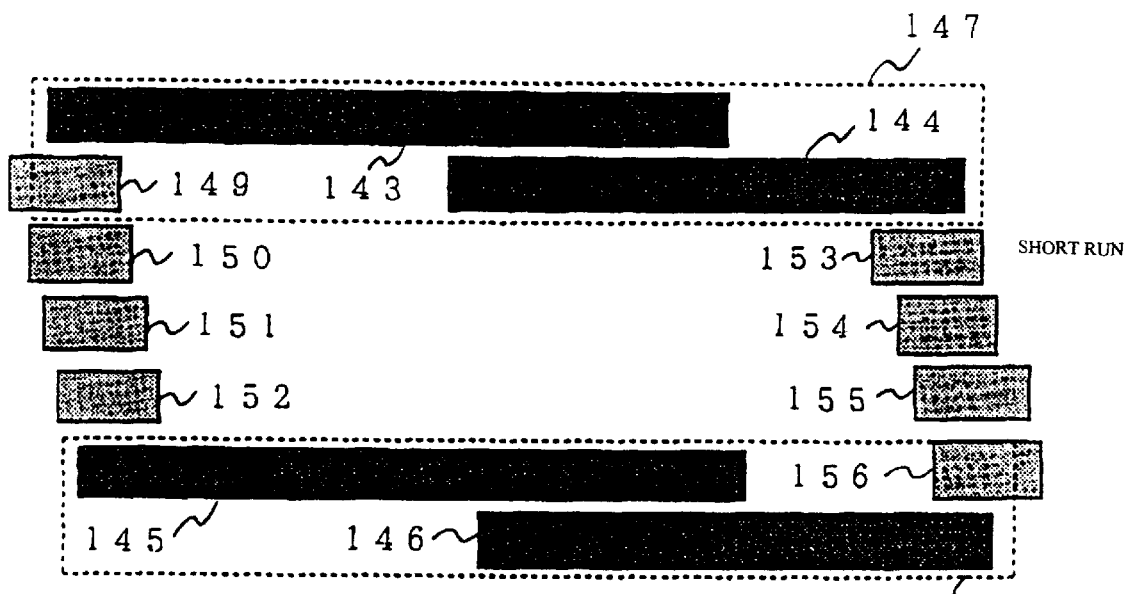

In step 501, the provisional ruled lines are extracted in a horizontal direction. Such a process may be performed by examining the length of a black run in comparison to a threshold of the ruled line of the original rectangle. FIGS. 5A–5C illustrate an exemplary process of detecting of provisional ruled lines in the horizontal direction. In FIG. 5A, black runs 121 and 122 which have a relatively long length compared with a predetermined threshold are merged together. Consequently, black runs 121 and 122 are utilized to construct a provisional ruled line 123 in the horizontal direction.

On the other hand, relatively short runs which are shorter than a predetermined threshold such as 126, 127, 128, 129 and 130 in FIG. 5B would not be merged together as a black run. However, black runs 124 and 125 may be merged together to form the black run 134. The short runs 126–130 are preferably disregarded in the construction of the provisional ruled line. Similarly, the short runs 149–156 of FIG. 5C would be discarded and FIG. 5C would result in a provisional ruled line 147 constructed utilizing the black runs 143 and 144 and would also result in the black run 148 constructed by the lines 145 and 146.

After step 501 is performed, step 502 of FIG. 4A is performed which extracts provisional ruled lines in a vertical direction in a similar manner as step 501 extracts provisional ruled lines in the horizontal direction. Step 503 eliminates the provisional ruled lines which do not have a sufficient width to height ratio. For example, step 503 analyzes the width to height ratio of each of the provisional ruled lines. The width and height of the provisional ruled lines is determined using the end points, for example for vertices of the provisional ruled line. If the provisional ruled line is not sufficiently thin as compared to the original rectangle, the provisional ruled line can be eliminated from the ruled line candidates.

Step 504 then eliminates the provisional ruled lines which are not long enough as compared with the lines of the original of the original rectangle. Step 504 is performed by comparing the length of the provisional ruled line with the length of the original rectangle and if the provisional ruled line is not sufficiently close in length to the original rectangle, the provisional ruled line would be eliminated. For example, the provisional ruled line may be required to be within 80% of the width (or height) of the original rectangle, although other desired thresholds for comparison may be used such as 90%, 70%, 60%, 50%, or any other desired threshold may be used. From step 504, flow proceeds to process A illustrated in FIG. 4B.

Figure 4B:
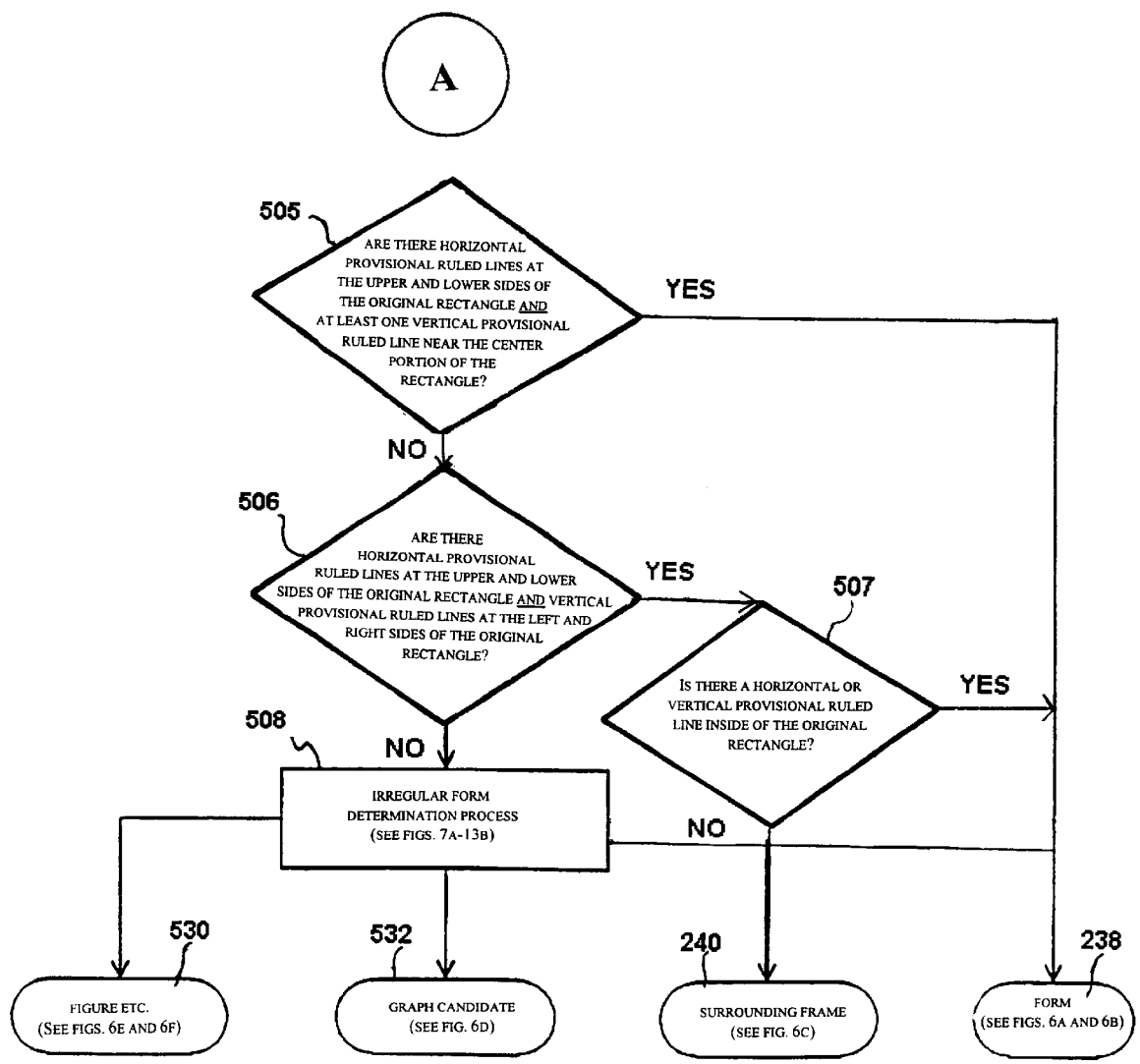
Figure 6A:
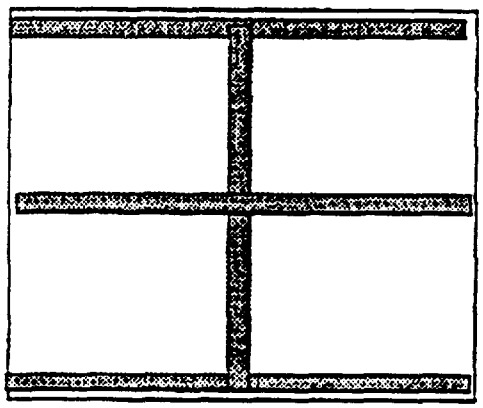
FIGS. 6A–6F illustrate various arrangements of provisional ruled lines and specifically.

FIG. 4B contains three analyses steps 505, 506, and 507 to further classify the original rectangle and the contents thereof. In step 505, it is determined whether there are horizontal provisional ruled lines at the upper and lower sides of the original rectangle and at least one vertical provisional ruled line near the center portion of the rectangle. If the condition of set 505 exists, flow proceeds to step 238 which classifies the original rectangle as a form. For example, FIG. 6A illustrates an original rectangle which satisfies the requirements of step 505.

Figure 6B:
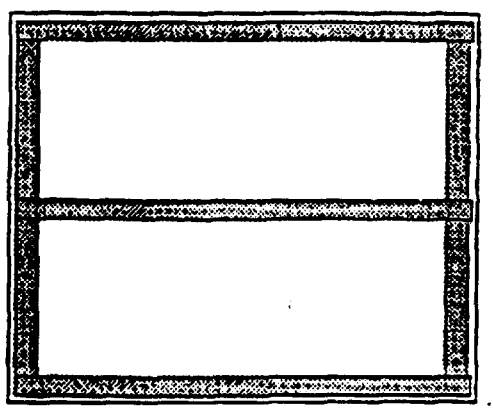
Figure 6C:
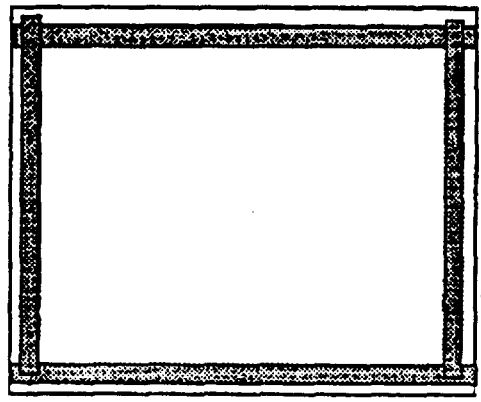

If the condition of step 505 is not satisfied, step 506 is performed which determines if there are horizontal provisional ruled lines at the upper and lower sides of the original rectangle, and if there are vertical provisional ruled lines at the left and right sides of the original rectangle. If this condition is not satisfied, an irregular form may exist and flow proceeds to step 508 (which is explained in detail with respect to FIGS. 7A–13B) which classifies the original rectangle as a figure or other type of candidate, step 532 which determines that the original rectangle is a graph candidate, or step 238 which determines that the original rectangle is a form. Alternatively, if the determination of step 506 is affirmative, flow proceeds to step 507 which determines if there is a horizontal or vertical provisional ruled line inside of the rectangle. If there is not, flow proceeds to step 240 which indicates that the original rectangle is a surrounding frame as indicated in FIG. 6C. If there is a horizontal or vertical provisional ruled line inside of the original rectangle, flow proceeds to step 238 which indicates that the original rectangle is a form such as illustrated in FIG. 6B.

Figure 6D:
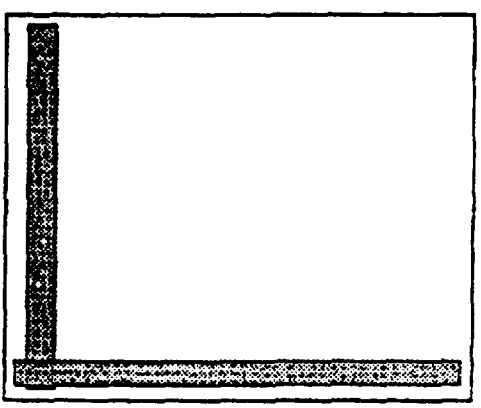
Figure 6E:
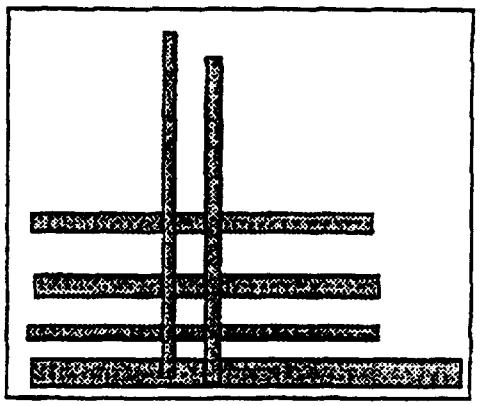
Figure 6F:
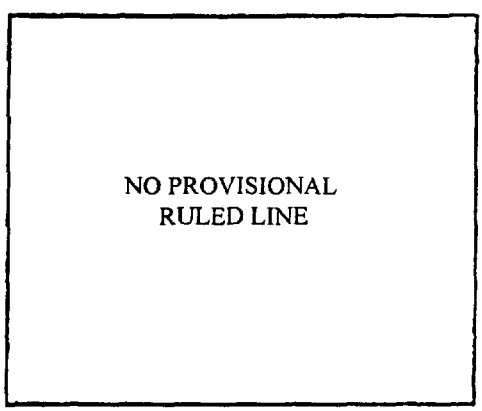

In FIGS. 6A–6F, the original rectangle is defined by thin lines at the perimeter of the figures. The thicker lines of these figures indicate provisional ruled lines. When the original rectangle is determined to be a figure or other (etc.) in step 530 of FIG. 4B, the original rectangle may have the construction as set forth in FIGS. 6E or 6F. FIG. 6F is an image which does not contain a provisional ruled line and may contain, for example, a bit-mapped image or picture (e.g., graphic) which is the form candidate. This is the type of image which results in step 530. FIG. 6D illustrates a graph candidate which is determined to exist in step 532 of FIG. 4B. Such a graph candidate has a vertical provisional ruled line at the left side of the original rectangle and a horizontal provisional ruled line at the bottom portion of the rectangle, although one or more of these lines may appear at different edges of the original rectangle, depending on how the graph candidates are defined.

Figure 7A:
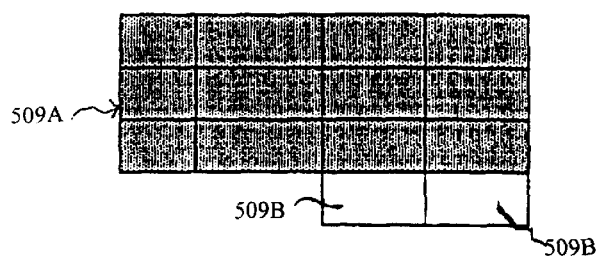
FIGS. 7A–7C illustrate the cores of various irregular forms.
Figure 7B:
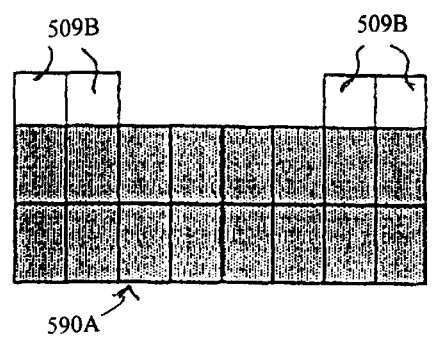
Figure 7C:
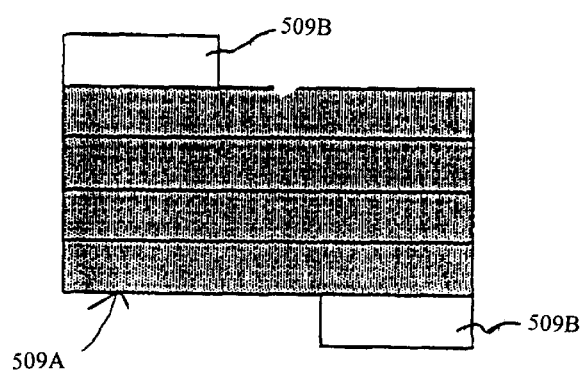

When the condition of step 506 is determined not to exist, the irregular form discrimination process set forth in step 508 of FIG. 4B is performed. Exemplary irregular forms are illustrated in FIGS. 7A–7C. In each of these figures, a core of the irregular form is designated by the reference 509A. The core is a rectangular area, for example, which does not contain areas which stick out therefrom such as the areas designated by 509B in FIGS. 7A–7C. By analyzing characteristics of the original rectangle with respect to two cores constructed for the irregular rectangle, further information of the original rectangle including the irregular forms can be determined. One possible definition of the core is a rectangular area which exists within the irregular form area having at least one pair of sides which have nearly or approximately the same width or height of the irregular form. It is to be noted that the core which is defined to be rectangular is not required to have a parameter which corresponds to actual lines of the form. The core may be defined by provisional ruled lines which do not exist completely across or up and down along the form. Additionally, due to an irregular or strange shape of the form, for example when there is not a horizontal line but a wavy line which extends along the horizontal direction, it may not be possible to generate a core having a width which is greater than the height, although it may be possible to generate a core which has a height which is greater than the width, for example.

Figure 8A:
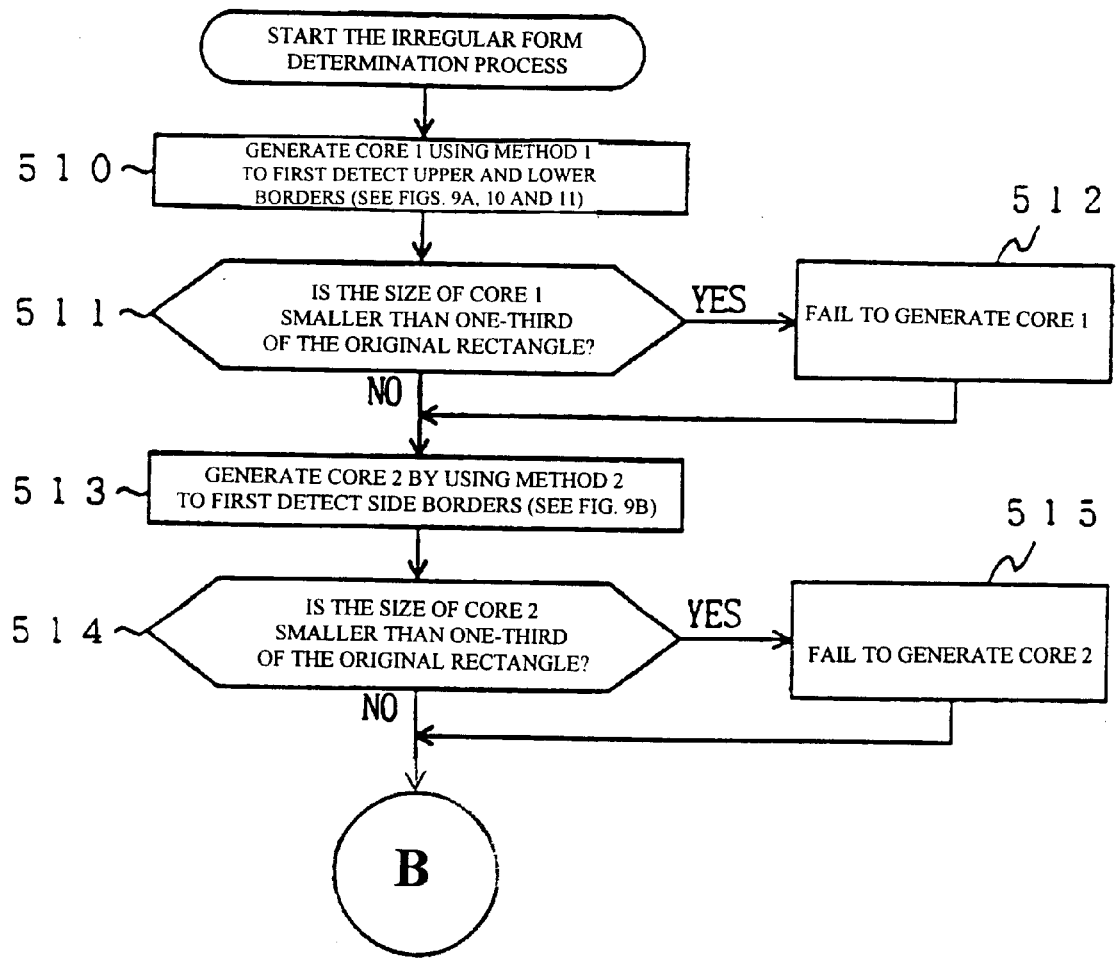
FIGS. 8A and 8B are a flowchart for detecting an irregular form area utilizing the construction of cores.
Figure 8B:
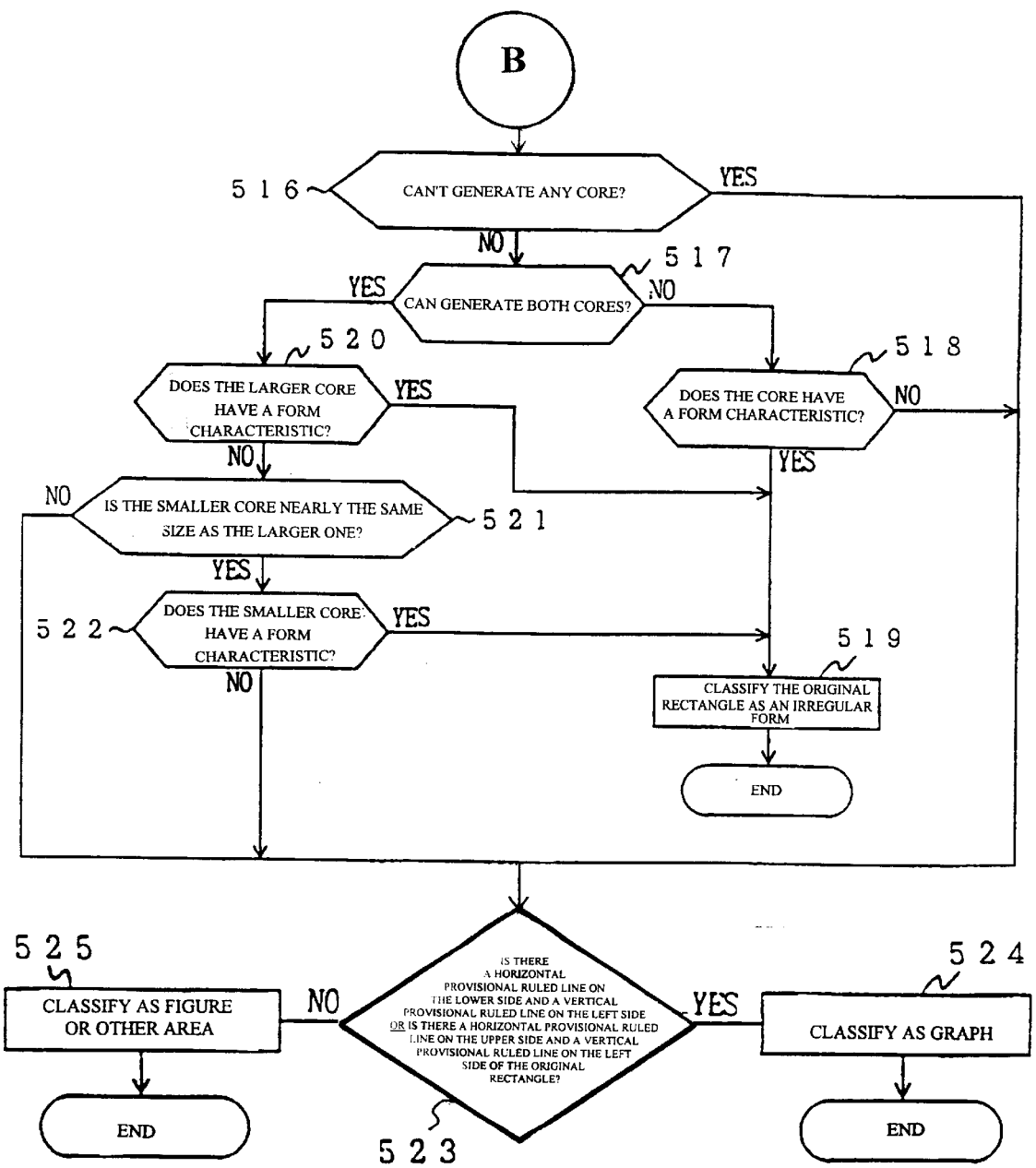

Details of the irregular formed determination process performed by step 508 of FIG. 4B are set forth in the process illustrated in FIGS. 8A and 8B. After starting the irregular form determination process of FIG. 8A, step 510 generates a first core (referred to as core 1) using a first method (method 1) which first detects the upper and lower borders of the core as set forth in FIGS. 9A, 10 and 11.

The process of generating the first core in accordance with the first method is explained below. FIG. 9A(1) illustrates an irregularly shaped form 159. In order to construct the core of this form 159 using the first method, first the upper and lower borders 160 and 161 are determined as illustrated in FIG. 9A(2). Subsequently, the sides 162 and 163 of the core 1 are determined as illustrated in FIG. 9A(3). Thus, the first core is defined by the sides 160, 163, 161 and 162.

As an alternative to constructing the first core as illustrated in FIGS. 9A(1)–9A(3), a second core may be constructed as illustrated in FIGS. 9B(1)–9B(3). Starting with the same core 159 in FIG. 9B(1), the sides 164 and 165 of this core are first determined as illustrated in FIG. 9B(2). Subsequently, the top and bottom 166 and 167 of the second core are determined as illustrated in FIG. 9B(3).

Figure 10:
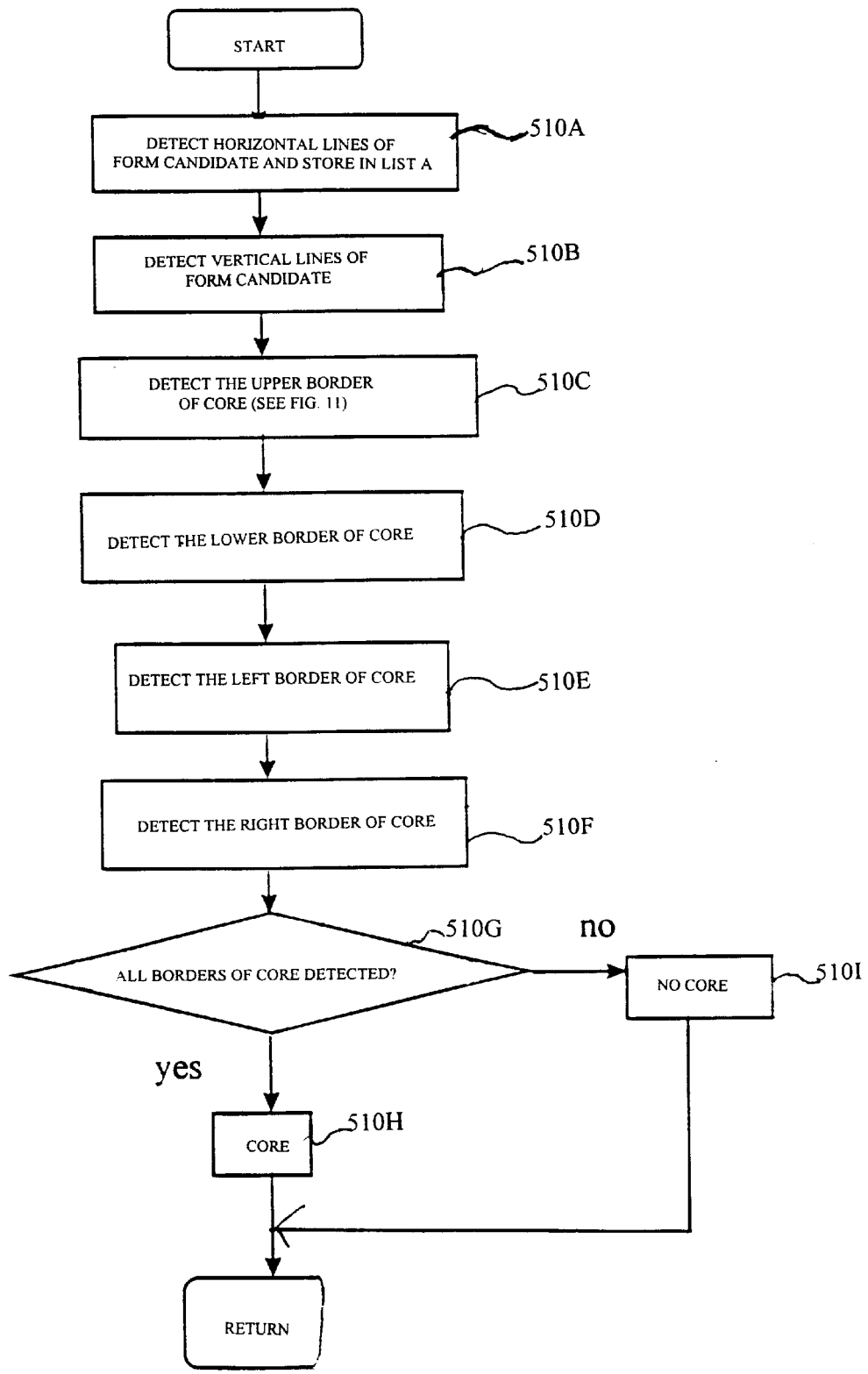
FIG. 10 is a flowchart illustrating a process of detecting a core.

FIG. 10 illustrates a process of determining core 1 using method 1. This process is performed by step 510 of FIG. 8A. After starting, step 510A detects the horizontal lines of the form candidate and stores these horizontal lines. For example, these lines may be stored in any desired format including a list A which is utilized later. Next, step 510B detects the vertical lines of the form candidate. Step 510C then detects the upper border of the core. Details of how step 510C is performed are set forth in FIG. 11.

Figure 11:
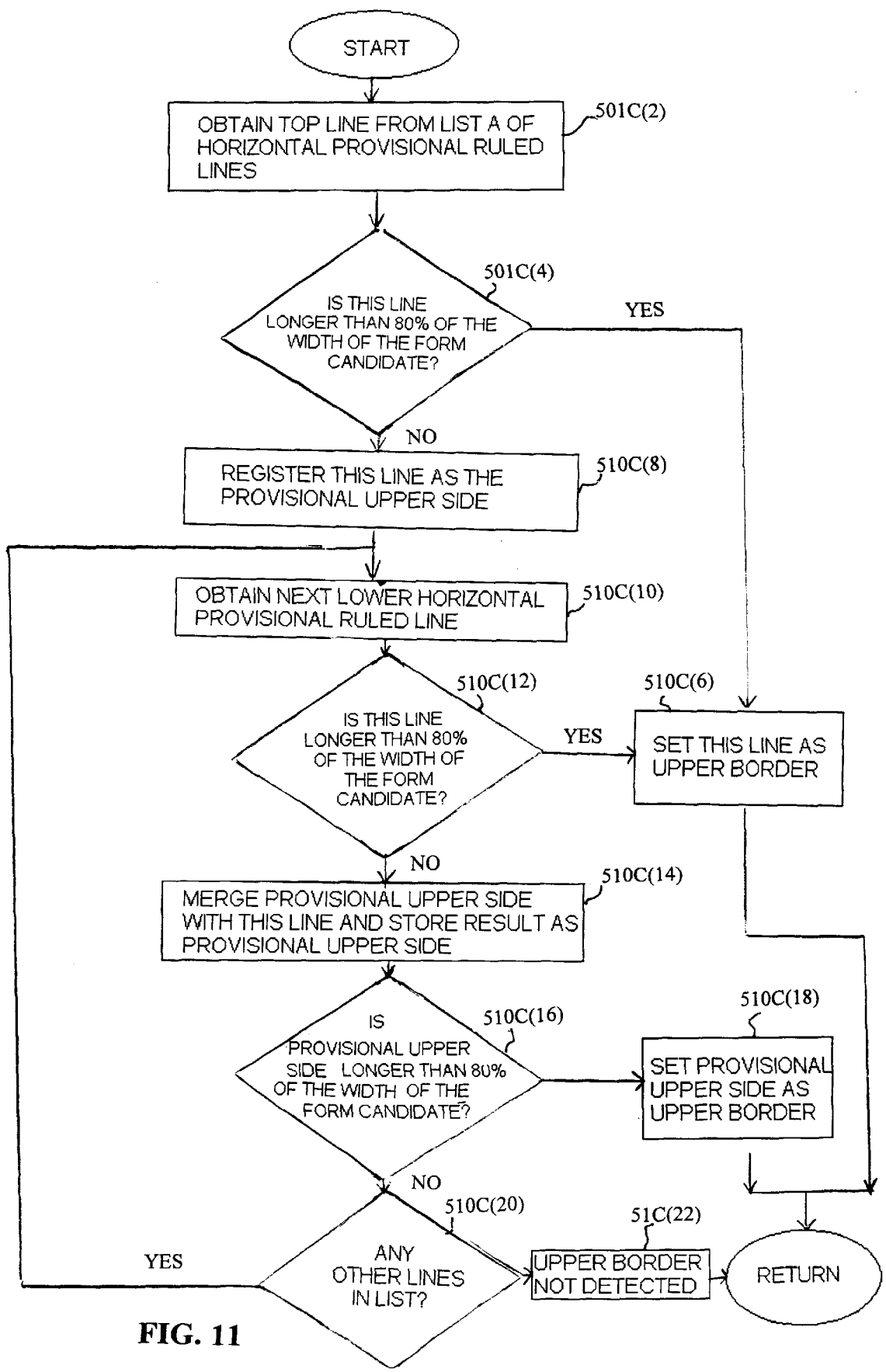
FIG. 11 is a flowchart illustrating the process of detecting an upper border of a core.

In FIG. 11, after starting, step 510C(2) obtains the top line from the list A containing the horizontal provisional ruled lines. If desired, the horizontal provisional ruled lines may be sorted so that the first line is the top-most horizontal line and the last line is the bottom-most horizontal line. Next, step 510C(4) determines if this line (e.g., the top line) is longer than 80% of the width of the form candidate. If it is, the top line is most likely the upper border of the form candidate and flow proceeds to step 510C(6) which sets this line as the upper border, and flow returns to the calling process (e.g., FIG. 10). It is to be noted that the threshold of 80% is one possible predetermined threshold of the line and this threshold may be set to be higher or lower, if desired, such as at 95%, 90%, 70%, or any other desired or appropriate percentage. These other percentages may also be used in the determinations set forth in steps 510C(12) and 510C(16).

If step 510C(4) determines that this line is not longer than 80% of the width of the form candidate, flow proceeds to step 510C(8) which registers this line as the provisional upper side. This line will not actually be the upper side or border of the core but is merely registered so that further calculations may be performed. Next, step 510C(10) obtains the next lower horizontal provisional ruled line. Step 510C(12) determines if this line is longer than 80% of the width of the form candidate. If it is, step 510C(6) is performed which sets this line as the upper border. Alternatively, if this line is not longer than 80% of the width of the form candidate, flow proceeds to step 510C(14) which merges the provisional upper side with this line and stores the result as the new provisional upper side.

Figure 12:
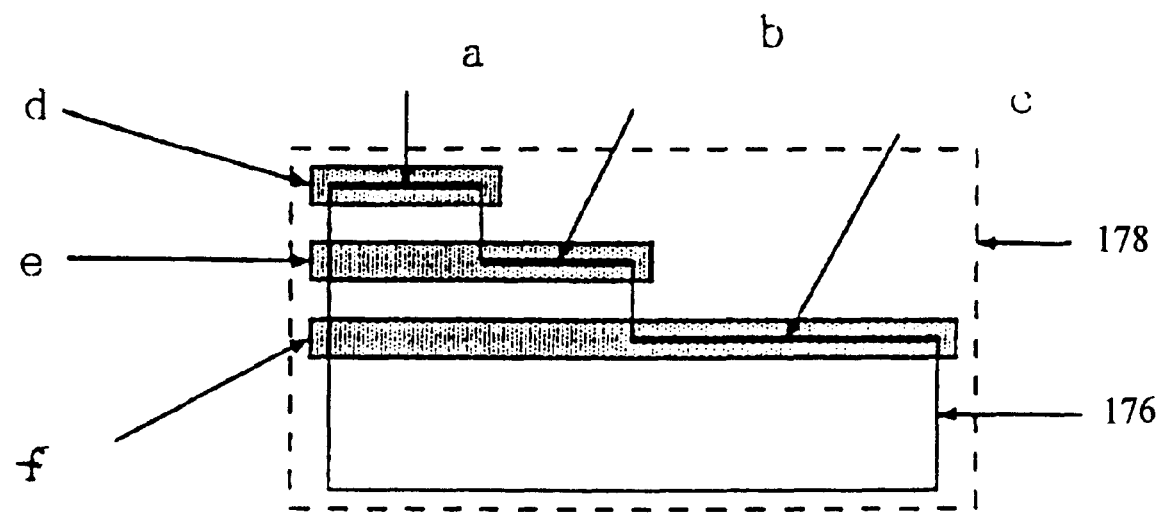
FIG. 12 illustrates an example of detecting the upper border of a core.

An example of the merging which is performed in step 510C(14) is set forth in FIG. 12. For example, FIG. 12 illustrates an irregular form 176 surrounded by a circumscribing rectangle defining a form candidate 178. The form 176 contains a provisional ruled line a. This provisional ruled line is initially set to be the provisional upper side d by step 510C(8). Next, the merging of the provisional ruled line a with the provisional ruled line b illustrated in FIG. 12 results in the new provisional upper side e of FIG. 12. The merging may be defined as adding the provisional ruled line a with the provisional ruled line b along the X or width direction. Similarly, merging the provisional upper side e with the provisional ruled line c results in a new provisional upper side f which ultimately becomes the upper border of the core.

Returning back to FIG. 11, step 510C(16) determines if the provisional upper side is longer than 80% of the width of the form candidate. If it is, the provisional upper side is set as the upper border of the core in step 510C(18) and flow is returned to the calling process. Step 510C(16) would result in an affirmative determination when the provisional upper side f is examined by step 510C(16).

When there is a negative determination by step 510C(16), flow proceeds to step 510C(20) which determines if there are any other lines in the list A. If there are, flow proceeds back to step 510C(10) which obtains the next lower horizontal provisional ruled line and the process repeats. Alternatively, if there are no other lines in the list, flow proceeds from step 510C(20) to step 510C(22) which indicates that the upper border is not detected. As the upper border is not detected, it may not be possible to construct the core. From 510C(22), flow proceeds to the calling process.

After performing step 510C in FIG. 10, the lower border of the core is determined by step 510D. This uses a process similar to the process of FIG. 11 but begins with the bottom line instead of the top line in step 510C(2) and increments to the next higher horizontal provisional ruled line in step 510C(10). The left border of the core is then determined in step 510E and the right border of the core is determined in 510F. Steps 510E and 510F are performed in a similar manner as the process illustrated in FIG. 11 but operates in a horizontal direction, starting on the left side for step 510E and proceeding to the right side or alternatively, starting on the right side of the form candidate for step 510F and proceeding to the left side. Subsequently, step 510G determines if all borders of the core have been detected and if not, flow proceeds to step 510I which indicates that a core has not been detected. Alternatively, if all borders of the core were detected, flow proceeds to step 510H which indicates that a core has been detected and flow returns to the calling process.

After step 510 generates the first core (or attempts to generate the first core), step 511 is performed which determines if the size of the first core is smaller than one-third of the original rectangle. If this is the case, flow proceeds to step 512 which determines that the first core was not properly generated. Step 513 then generates a second core using a second method which first detects the side borders of the core for example as illustrated in FIGS. 9B(1)–9B(3).

FIG. 9B(1) illustrates the same irregularly shaped form 159 as is illustrated in FIG. 9A(1). In order to construct the core of this form 159 using the second method, first the side borders 164 and 165 are determined as illustrated in FIG. 9B(2). Subsequently, the top 166 and bottom 167 of the core 2 are determined as illustrated in FIG. 9B(3). Thus, the second core is defined by the sides 164, 166, 165, and 167.

The process of detecting core 2 using method 2 is similar to the process illustrated in FIG. 10 but instead of first detecting the upper and lower borders, the left and right borders are first determined followed by the detection of the upper and lower borders.

After generating core 2 using method 2 in step 513, step 514 is subsequently performed which determines if the size of core 2 is smaller than ⅓ of the original rectangle. If it is, flow proceeds to step 515 which indicates that the process failed to properly generate the core 2. Because the core is much smaller than the original rectangle, the core is considered to be improper or not have the proper characteristics as compared to the original rectangle. From a negative determination in step 514 and from step 515, flow proceeds to process B illustrated in FIG. 8B.

In FIG. 8B, step 516 determines if neither core 1 nor core 2 could be generated. This determination and other determinations regarding the existence of the core are based on the results of steps 512 and 515 of FIG. 8A and also whether all four sides of the core could be generated in steps 510 and 513. If step 516 determines that one of the cores was successfully generated, flow proceeds to step 517 which determines if both of the cores were generated. If both cores were not generated and only one of the cores was generated, flow proceeds from step 517 to step 518 which examines whether the core which was generated has the characteristic of a form. The examination of whether the core has the form characteristic utilizes the same process set forth in FIGS. 4A and 4B which provides the candidates of the form. Thus, the detailed processing is the same as the process performed in steps 501 and 507 and a second detailed description of the steps is omitted. If there is detected a form characteristic, then flow proceeds to step 519 which classifies the original rectangle as an irregular form and the process ends. Alternatively, if step 518 determines that the core does not have the characteristics of a form, the original discriminated rectangle is not a form but some other type of image and flow proceeds to step 523 to determine the other type of image.

If step 517 determines that both cores were generated, flow proceeds to step 520 which determines if the larger core has the characteristic of a form. This is the same type of process performed in step 518. If it is determined that the larger core does have a form characteristic, flow proceeds to step 519 which classifies the original rectangle as an irregular form. Alternatively, if step 520 determines that the larger core does not have a form characteristic, flow proceeds to step 521 which determines if the smaller core is nearly the same size as the larger core. If the difference of the size between the two cores is larger than a predetermined threshold, such as 95, 90, 85 or 80%, then the original rectangle is not classified as a form area but is some other type of area and flow proceeds to step 523. Alternatively, if the smaller core has nearly the same size as the larger core, flow proceeds from step 521 to step 522 which determines if the smaller core has the form characteristic. Step 522 is performed in a similar manner as steps 520 and 518 are performed. If step 522 results in an affirmative determination, flow proceeds to step 519 which classifies the original rectangle as an irregular form. Alternatively, if the smaller core does not have a form characteristic, flow proceeds to step 523 to determine a further classification of the original rectangle.

Step 523 classifies the original rectangle as either a graph or another type of area such as a figure (or something which does not have the characteristics of a form, graph, etc.). In step 523, it is determined whether there is a horizontal provisional ruled line on the lower side and a vertical provisional ruled line on the left side of the original rectangle, or alternatively, if there is a horizontal upper side and a vertical provisional ruled line on the left side of the original rectangle. If either of these two conditions exist, the provisional ruled lines form a graph and step 524 classifies the original rectangle as a graph and the process ends. Alternatively, if the condition of step 523 is not satisfied, the original rectangle is classified as a figure or other area and the process ends.

Figure 13A:
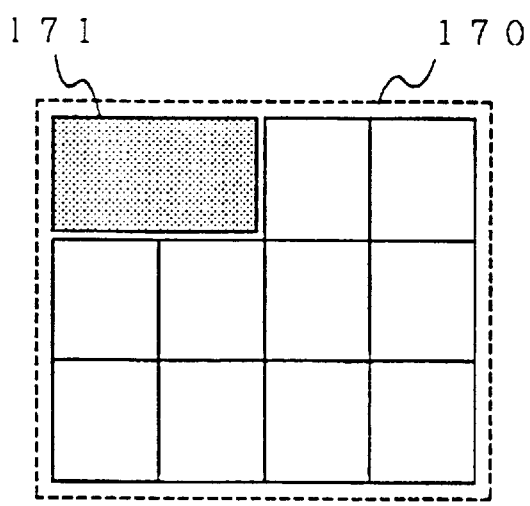
FIGS. 13A and 13B illustrate examples of the representation of irregular form areas.
Figure 13B:
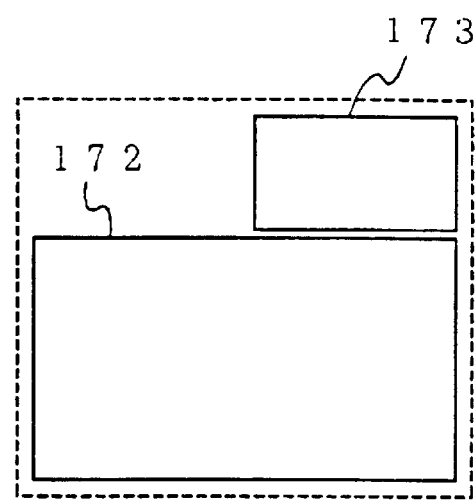

After a candidate is determined to be an irregular form area, it is desirable to store information defining the irregular form. Referring to FIG. 13A, the irregular form is defined by a rectangle 170 minus the rectangle 171 which is outside of the irregular form area. Alternatively, it is possible to define the irregular form area as being the sum of a first rectangle 172 and a second rectangle 173 as illustrated in FIG. 13B.

Figure 14:
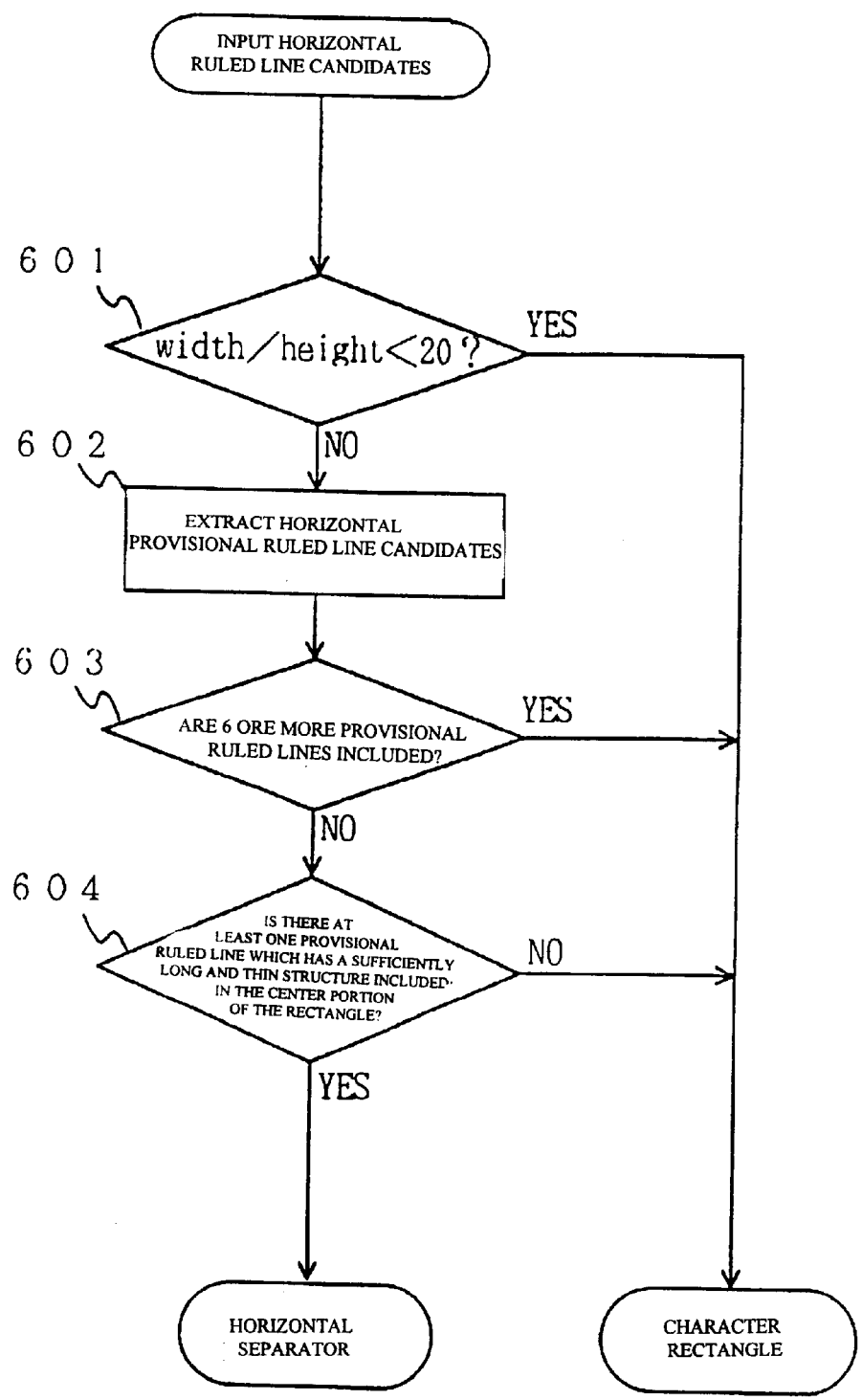
FIG. 14 is a flowchart for classifying horizontal ruled lines utilized by step 600 of FIG. 2.

FIG. 14 is a flowchart of the classification step 600 set forth in FIG. 2 which classifies the horizontal ruled line candidates. Because the rough classification of step 200 in FIG. 2 only considered the size of the rectangles, this classification performs a more specific classification which classifies the input elements as either character candidates or a horizontal ruled line.

After starting in FIG. 14, step 601 compares the ratio of the width to the height of the rectangle with a predetermined threshold; that is, the value of the width of the candidate rectangle is divided by the height of the candidate rectangle and compared to a threshold. For example, the threshold of determining the horizontal ruled line may be 20, although a higher or lower threshold may be utilized depending upon the design of the system and other requirements. This process utilizes the difference of the ratio between the character rectangles and the horizontal ruled line as a separator in the document image. If the ratio of the width to the height is less than a predetermined threshold, the candidate is determined to be a character rectangle. Alternatively, if step 601 determines that the ratio of the width to the height is not less than a predetermined threshold, flow proceeds to step 602 which extracts horizontal provisional ruled line candidates. This is performed by a scanning in the candidate rectangle and extracting a black run which is longer than a predetermined threshold in the horizontal direction as the provisional ruled line.

Next, step 603 examines the number of provisional ruled lines and, for example, determines if there are six or more provisional ruled lines. This threshold of six ruled lines may be adjusted upwardly or downwardly depending upon the design of the system and if there are six or more provisional ruled lines, it is determined that there is a character rectangle. Alternatively, if step 603 determines there are not six or more provisional ruled lines, flow proceeds to step 604 which determines if there is at least one provisional ruled line which has a sufficiently long and thin structure included in the center portion of the rectangle. If this is the case, the candidate of the horizontal ruled line is determined to be a horizontal separator. Alternatively, if the determination in step 604 is negative, the candidate of the horizontal ruled line is determined to be a character rectangle.

Figure 15:
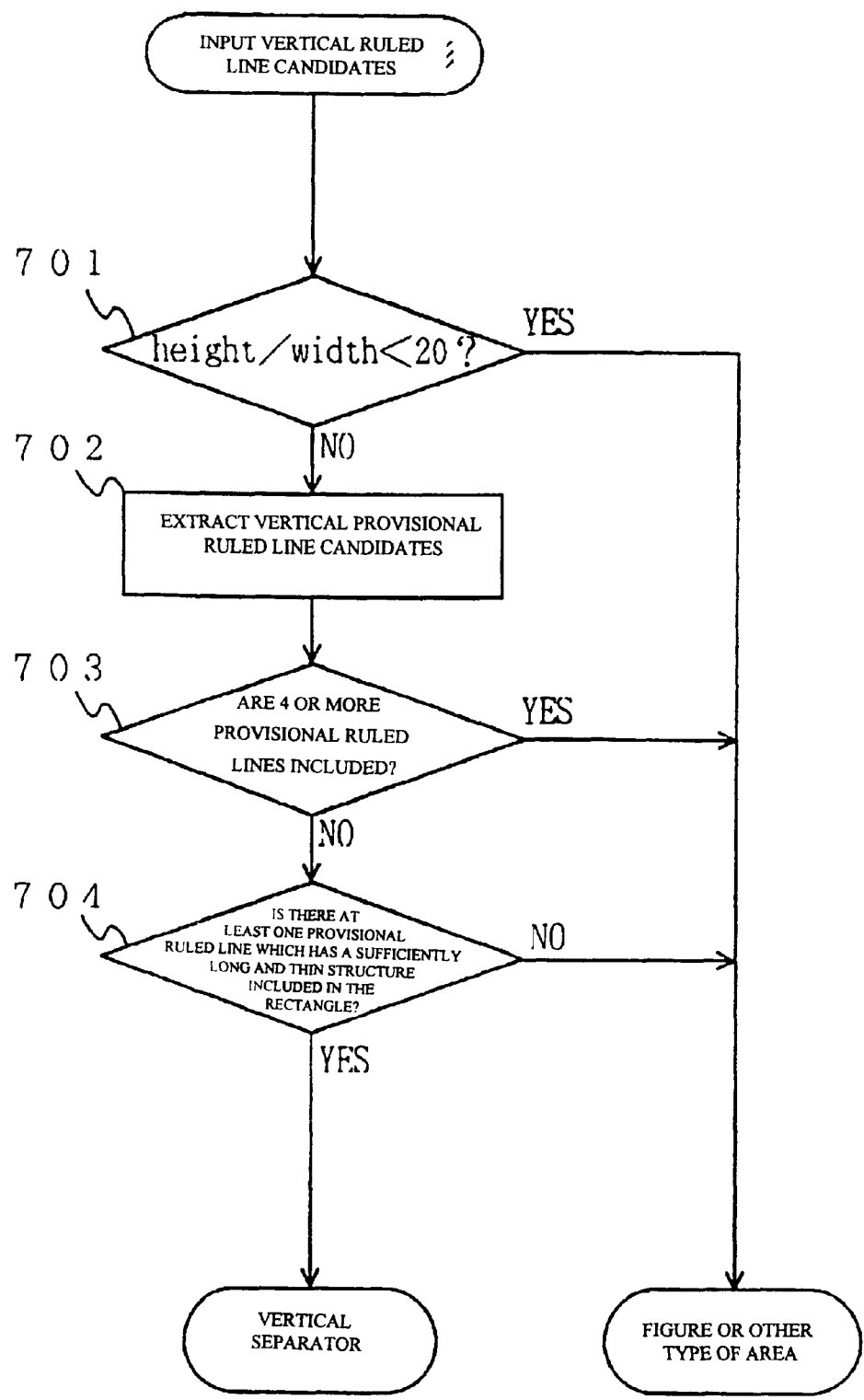
FIG. 15 is a flowchart illustrating the classification of vertical ruled line candidates performed by step 700 of FIG. 2.

FIG. 15 is a flowchart illustrating the specific classification of vertical ruled line candidates performed in step 700 of FIG. 2. This process is similar to the process illustrated in FIG. 14 but is performed for vertical ruled lines obtained from the rough classification step 200 of FIG. 2.

After starting in FIG. 15, vertical ruled line candidates are input. Step 701 then compares the ratio of the height to the width of these rectangles with a predetermined threshold. For example, this threshold for the ruled line may be 20. If the ratio is less than the threshold, the candidate is determined to be a figure or other type of area. Alternatively, if the determination in step 701 is negative, flow proceeds to step 702 which extracts the vertical provisional ruled line candidates. This step is performed by extracting the black run which is longer than the predetermined threshold in the vertical direction as a provisional ruled line. Subsequently, in step 703, there is a determination if there are four or more provisional ruled lines. If there are four or more vertical lines, the candidate is determined to be a figure or other type of area. If there are not four or more ruled lines, flow proceeds to step 704 which determines whether there is a sufficiently long and thin structure included within the rectangle. If there is, the candidate is determined to be a vertical separator. Alternatively, if there is not at least one provisional ruled line which has a sufficiently long and thin structure, the candidate is determined to be a figure or other type of area.

In step 800 of FIG. 2, there is a classification of whether a character is inside or outside of a form. In a conventional method or system, there cannot be a discrimination as to whether a character is inside or outside of an irregular form because the character rectangles are merged with the irregular form area. However, the present invention allows the performing of OCR on character images which are both inside of and outside of an irregular form.

Figure 16A:
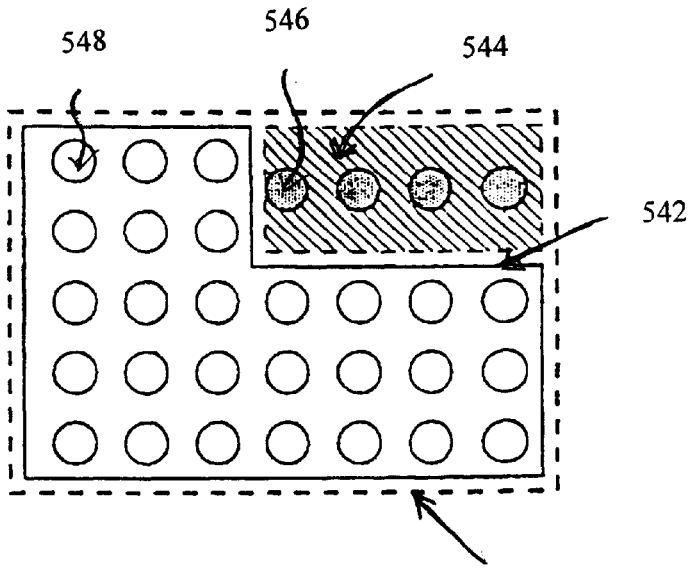
FIGS. 16A and 16B illustrate characters which are contained both inside and outside of irregular form areas.

Before proceeding to describe the process to determine whether a character image is inside of or outside of a form, an explanation is provided regarding character images inside of and outside of the form. In FIG. 16A, there is illustrated an original rectangle 540 containing therein an irregular form 542. There is a diagonally hatched region 544 within the rectangle 540 but outside of the form 542 which signifies that the shaded circles are outside of the irregular form. There are also white circles 548 which signify character rectangles inside of the irregular form. The dark circles 546 also signify character rectangles.

Figure 16B:
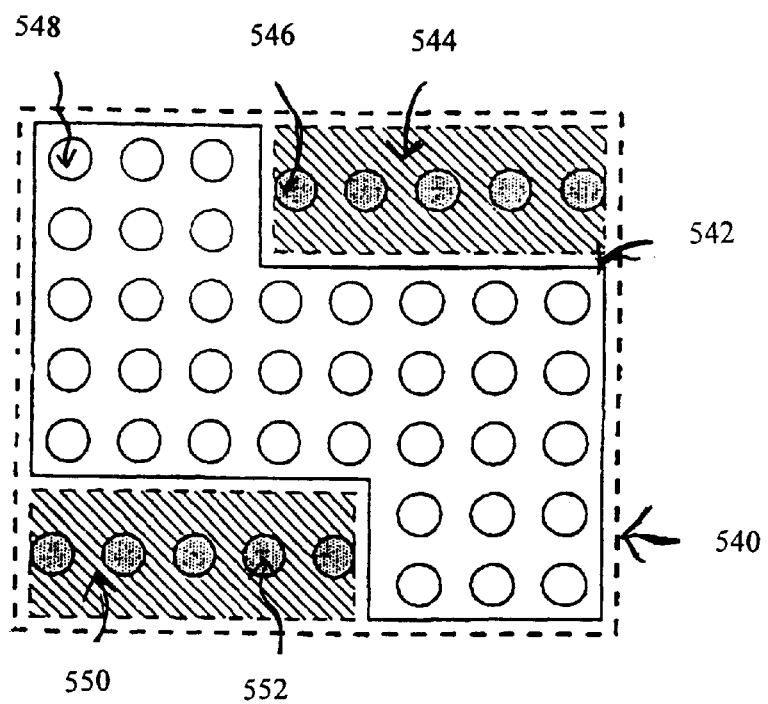

Accordingly to the previously described process, the rectangles can be extracted in the specific classification process which is provided after the rough classification process 200 of FIG. 2. Therefore, the character rectangles are discriminated in the form candidate area based on a size analysis of the characters. The same criteria of the standard character size can be utilized in a similar manner as is utilized in the rough classification. FIG. 16B is similar to FIG. 16A except that the original rectangle 540 contains two sections 544 and 550 which are not within the irregular form 542.

Figure 17:
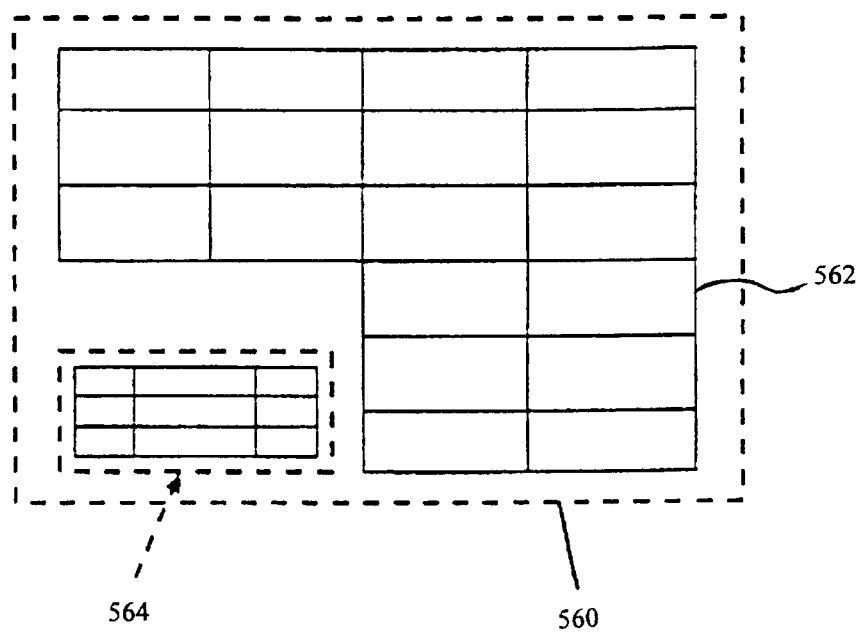
FIG. 17 illustrates a circumscribing rectangle having an irregular form and a second form contained therein.

Referring to FIG. 17, there is illustrated an original rectangle 560 containing an irregular form 562 and a form 564. In order to properly perform the process of determining whether a character is inside or outside of a form, it is preferable to work with one form at a time. For example, in FIG. 17, the original rectangle 560 contains an irregular form 562 and a form 564. When examining whether a character rectangle or other character candidate is within the irregular form 562, the form 564 which is a rectangle is ignored. It is preferable to also ignore all character candidates contained within the rectangle 564.

Figure 18:
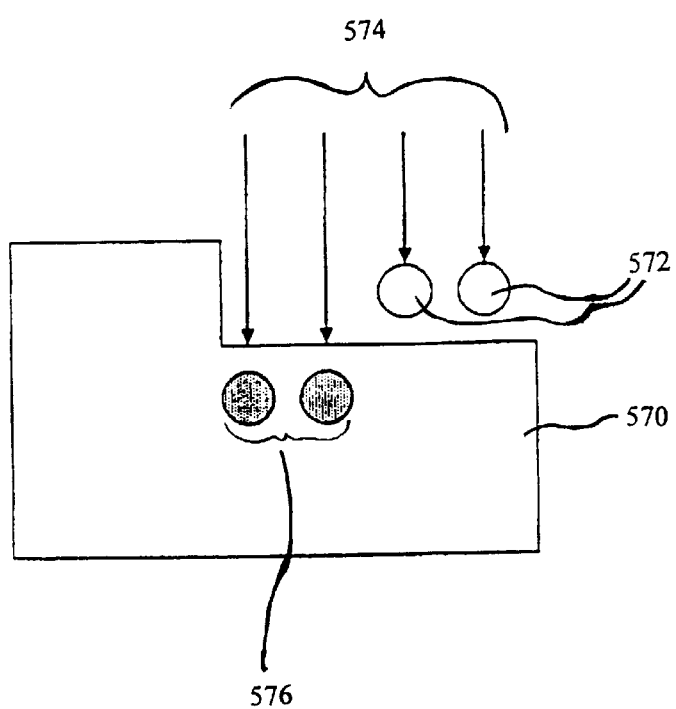
FIG. 18 illustrates character areas which are both visible and not visible from the top of the irregular form.

Before describing the process used to determine whether a character rectangle or character candidate is within or outside of a form, some terminology which will be utilized in the description of the method is explained with respect to FIG. 18. FIG. 18 illustrates an irregular form 570 having two character rectangles 572 outside of the form and two shaded character rectangles 576 which are inside of the form. There are four arrows 574 which indicate that the irregular form 570 is examined from the top side of the irregular form. When viewed from the top side of the form in the direction of the arrows, the two circles 572 which represent character rectangles are visible. However, the two left arrows 574 which originate from the top do not touch the character rectangles 576 because of the top portion of the irregular form 570. Therefore, it is stated that the character rectangles 576 are not visible or are invisible from the top of the irregular form 570.

Figure 19:
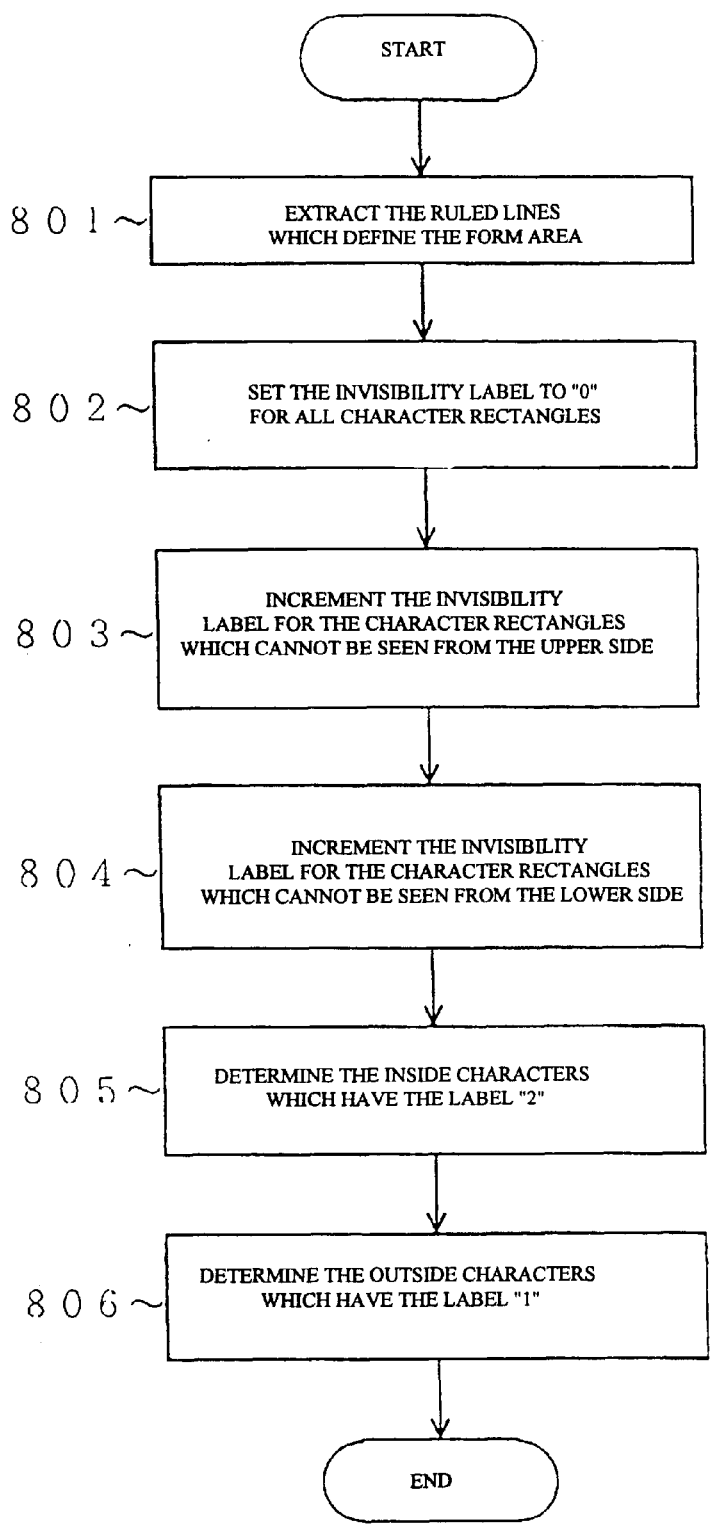
FIG. 19 is a flowchart of determining whether character areas are inside or outside of an irregular form.

In FIG. 19 which shows the flowchart of classifying whether a character rectangle is within or outside of the irregular form, after starting, step 801 extracts the ruled lines which define the form area. In this step, even if there are other forms or surrounding frame areas in the rectangle, these other forms or frames are ignored or are eliminated in order to extract these ruled lines. In step 802, every character rectangle which exists is set to have an invisibility label of "0" for all character rectangles. The label 0 is used to indicated that the character rectangle is visible from a particular direction. By setting all character rectangles to 0 at the start of this process, it is assumed that all character rectangles are visible.

Figure 20A:
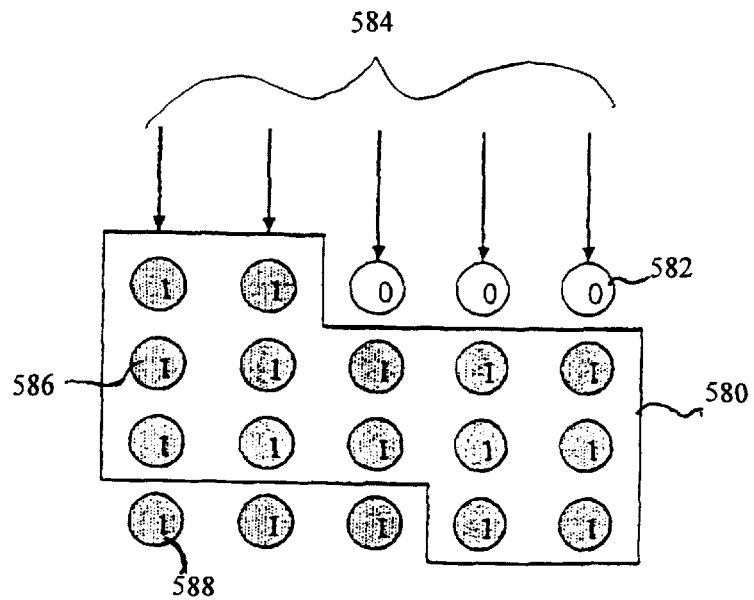
FIGS. 20A and 20B illustrate sequential processing from above and then below to determine whether characters are interior to or exterior to a form.

Next, step 803 is performed which examines from the top portion or upper side whether or not character rectangles are visible. If the character rectangles are visible, the invisibility label of the character rectangles is not altered but if the character rectangle is invisible, the invisibility label of the character rectangles are incremented by one. Referring to FIG. 20A, when viewed from the upper side along the arrows 584, the character rectangles such as the character rectangle 582 is visible. However, the character rectangle such as the character rectangle 586 within the form 580 along with the character rectangle 588 is not visible from the upper side and therefore, these character rectangles have their invisibility label incremented from 0 to 1 as illustrated in FIG. 20A.

Figure 20B:
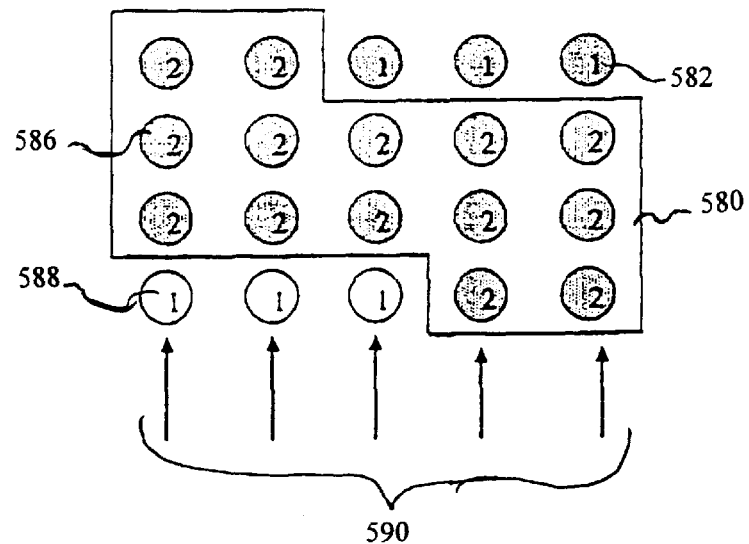

Next in FIG. 19, step 804 is performed which increments the invisibility label for the character rectangles which cannot be seen from the lower side. This step is illustrated in FIG. 20B which illustrates the white circles representing character rectangles such as the circle 588 not having its invisibility label incremented while all other circles in FIG. 20B which are shaded are invisible from the bottom portion and therefore, the character rectangles within the form 580 such as the character rectangle 586 is incremented by 1 along with all character rectangles above the form 580 such as the rectangle 582 are also incremented by 1.

Next in FIG. 19, step 805 determines the inside characters by determining the character rectangles which have the label 2. Step 806 then determines the characters which are outside of the form and these are the character rectangles which have the label of 1. See FIG. 20B which clearly illustrates that the characters within the form 580 have the interior character rectangles labeled with the invisibility label of 2 whereas the character rectangles which are outside of the form 580 have their invisibility label of 1. The process of FIG. 19 then ends.

While FIG. 19 has been described as performing the scanning from the upper and lower directions, it is also possible to perform the scanning from the left and right directions. Additionally, it is possible to perform scanning from both the upper and lower, and the left and right directions. By performing both horizontal and vertical scanning, when either one of the horizontal or vertical scanning determines that a character rectangle is outside of the form, then the character rectangle should be considered outside of the form. Such a scanning in both the horizontal and vertical direction has the advantage of determining character rectangles which may be nestled within a notch of the irregular form (not actually inside the irregular form) but invisible from both an upper and lower scan direction. However, the horizontal scan direction will be able to determine that the character rectangle is actually outside of the form.

If it were not possible, for example such as in prior art systems, to determine irregular forms, both the characters 572 and 576 in FIG. 18 would probably be determined to be in a single regular form. However, if an OCR process was performed only on text which is outside of the form, the text represented by the character rectangles 572 would not be detected. Thus, by the present invention being able to indicate character rectangles which are outside of an irregular form, an OCR process can be successfully performed on the character rectangles 572 of FIG. 18. It is to be noted that if desired, the OCR process can also be performed on the character rectangles 576 within the form in FIG. 18.

Figure 21:
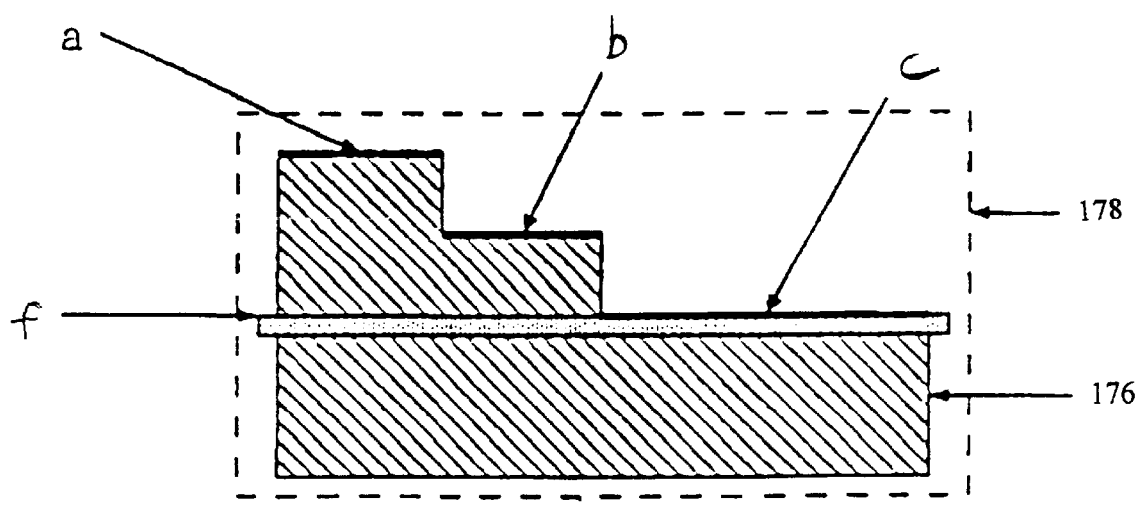
FIG. 21 illustrates a process of determining whether a character is exterior to an irregular form and whether the portion which is exterior to the regular form is above the line defining the top of the core.

FIG. 21 is presented in order to explain a manner of detecting character rectangles which are inside of an irregular form 176 but are above the line f defining the upper side of a core. First, line a is registered as an irregular side or projection of the irregular form area 176. Next, provisional ruled line b is registered as the next irregular side. When the upper side of the core defined by the line f is reached, the scanning operation is stopped. The area which is between the irregular side (e.g., defined by provisional line a or provisional line b) and the upper side of the core (defined by line f) are determined to be invisible. A similar process is also performed by the lower side. Further, such a process can also be performed for the left and the right sides. This process allows the determination that character rectangles within the irregular form but outside of the core are invisible and therefore, should be considered to be inside of the core.

Of course, once it is determined whether or not a character rectangle or character candidate is inside or outside of an irregular form, an OCR process can be performed in order to determine character codes representing images of the characters. These character codes can be represented in an ASCII format, for example and stored. These codes can also be transmitted to a printer in order to print the characters.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of processing an image, comprising the steps of:

obtaining an image which includes document image data;

determining a form candidate using the document image data;

extracting provisional ruled lines from the form candidate;

determining a structure of the form candidate by analyzing the provisional lines in a horizontal and vertical direction, including,
  determining whether or not the form candidate corresponds to a figure,
  determining whether or not the form candidate corresponds to a graph,
  determining whether or not the form candidate corresponds to a frame, and
  determining whether or not the form candidate corresponds to a form; and determining if character candidates which are proximate to the form candidate which is determined to correspond to a form are inside or outside the corresponding form,
  wherein the step of determining if the character candidates which are proximate to the form are inside or outside the corresponding form comprises:

determining if the character candidates are between a first perimeter of the corresponding form in a first viewpoint;

determining if the character candidates are between a second perimeter of the corresponding form, the second perimeter being opposite the first perimeter, in a second viewpoint opposite the first viewpoint; and determining that the character candidates are inside the corresponding form when it is determined that character candidates are not between the first perimeter in the first viewpoint, and are not between the second perimeter in the second viewpoint.

2. A method of analyzing whether character candidates are inside a form, comprising the steps of:

inputting an image containing a form and character candidates; and determining if the character candidates are inside or outside the form, including the steps of, determining if the character candidates are between a first perimeter of the form in a first viewpoint;

determining if the character candidates are between a second perimeter of the form, the second perimeter being opposite the first perimeter, in a second viewpoint opposite the first viewpoint; and determining that the character candidates are inside the form when it is determined that character candidates are not between the first perimeter in the first viewpoint, and are not between the second perimeter in the second viewpoint.

3. A system for processing an image, comprising:

means for obtaining an image which includes document image data;

means for determining a form candidate using the document image data;

means for extracting provisional ruled lines from the form candidate;

means for determining a structure of the form candidate by analyzing the provisional lines in a horizontal and vertical direction, including, determining whether or not the form candidate corresponds to a figure, determining whether or not the form candidate corresponds to a graph, determining whether or not the form candidate corresponds to a frame, and determining whether or not the form candidate corresponds to a form; and means for determining if character candidates which are proximate to the form candidate which is determined to correspond to a form are inside or outside the corresponding form, wherein the means for determining if the character candidates which are proximate to the form are inside or outside the corresponding form comprises:

means for determining if the character candidates are between a first perimeter of the corresponding form in a first viewpoint;

means for determining if the character candidates are between a second perimeter of the corresponding form, the second perimeter being opposite the first perimeter, in a second viewpoint opposite the first viewpoint; and means for determining that the character candidates are inside the corresponding form when it is determined that character candidates are not between the first perimeter in the first viewpoint, and are not between the second perimeter in the second viewpoint.

4. A system of analyzing whether character candidates are inside a form, comprising:

means for inputting an image containing a form and character candidates; and means for determining if the character candidates are inside or outside the form, including, determining if the character candidates are between a first perimeter of the form in a first viewpoint;

means for determining if the character candidates are between a second perimeter of the form, the second perimeter being opposite the first perimeter, in a second viewpoint opposite the first viewpoint; and means for determining that the character candidates are inside the form when it is determined that character candidates are not between the first perimeter in the first viewpoint, and are not between the second perimeter in the second viewpoint.

* * * * *